US011985735B2

(12) United States Patent
Eggers

(10) Patent No.: US 11,985,735 B2
(45) Date of Patent: *May 14, 2024

(54) ISOTHERM COOKING PLATE APPARATUS, SYSTEM, AND METHOD OF MANUFACTURE

(71) Applicant: Eggers & Associates, LLC, Dublin, OH (US)

(72) Inventor: Philip E. Eggers, Dublin, OH (US)

(73) Assignee: Eggers & Associates, LLC, Dublin, OH (US)

( * ) Notice: Subject to any disclaimer, the term of this patent is extended or adjusted under 35 U.S.C. 154(b) by 255 days.

This patent is subject to a terminal disclaimer.

(21) Appl. No.: 17/222,173

(22) Filed: Apr. 5, 2021

(65) Prior Publication Data

US 2021/0227634 A1 Jul. 22, 2021

Related U.S. Application Data

(63) Continuation-in-part of application No. 16/044,774, filed on Jul. 25, 2018, now Pat. No. 10,995,959, and a continuation-in-part of application No. 14/526,570, filed on Oct. 29, 2014, now abandoned.

(51) Int. Cl.
*H05B 1/02* (2006.01)
*A47J 37/06* (2006.01)
*H05B 3/12* (2006.01)
*H05B 3/26* (2006.01)

(52) U.S. Cl.
CPC ........ *H05B 1/0266* (2013.01); *A47J 37/0676* (2013.01); *H05B 3/12* (2013.01); *H05B 3/262* (2013.01); *H05B 2203/013* (2013.01); *H05B 2213/07* (2013.01)

(58) Field of Classification Search
CPC . A47J 37/0676; H05B 3/14–143; H05B 3/16; H05B 3/26–267; H05B 1/0266; H05B 3/688; H05B 2213/07; H05B 3/12; H05B 2203/013; Y10T 29/49117
USPC ............................................ 219/443.1–468.2
See application file for complete search history.

(56) References Cited

U.S. PATENT DOCUMENTS

| 6,137,089 A | * | 10/2000 | Pragt | ....................... | H05B 3/82 |
| | | | | | 219/544 |
| 6,222,166 B1 | * | 4/2001 | Lin | ....................... | H05B 3/265 |
| | | | | | 219/548 |
| 10,995,959 B2 | * | 5/2021 | Eggers | .................. | F24C 15/106 |

* cited by examiner

*Primary Examiner* — Sang Y Paik
(74) *Attorney, Agent, or Firm* — Emerson, Thomson & Bennett, LLC; Jerry K. Mueller, Jr.

(57) ABSTRACT

An isothermal cooking plate assembly is formed from a first plate of high thermal conductivity material having a back surface and an oppositely disposed top cooking surface. One or more heater circuit assemblies are disposed on the first plate back surface for forming a composite having a back surface. A controller is in electrical connection with the heater circuit assemblies for controlling temperature of the first plate of high thermal conductivity material. The first plate can be Aluminum Type 1100 or Aluminum Type 6061. The first plate can be a laminate formed from a clad bottom metal layer and clad top cooking surface metal layer, where the clad layers formed from the same material and having about the same thickness. The clad material can be austenitic stainless steel. A second plate of low thermal conductivity material can be attached to the composite back surface of first plate.

22 Claims, 15 Drawing Sheets

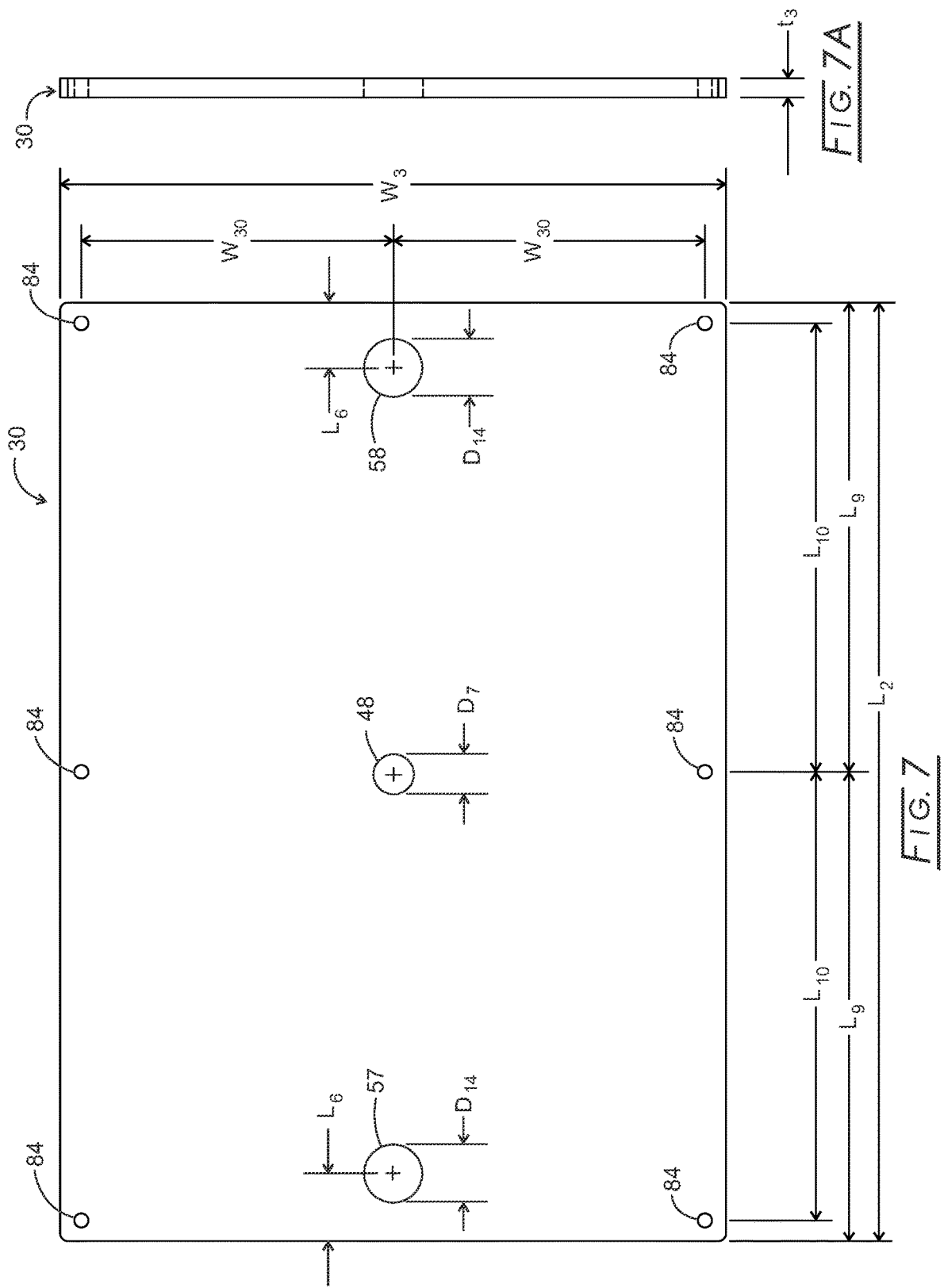

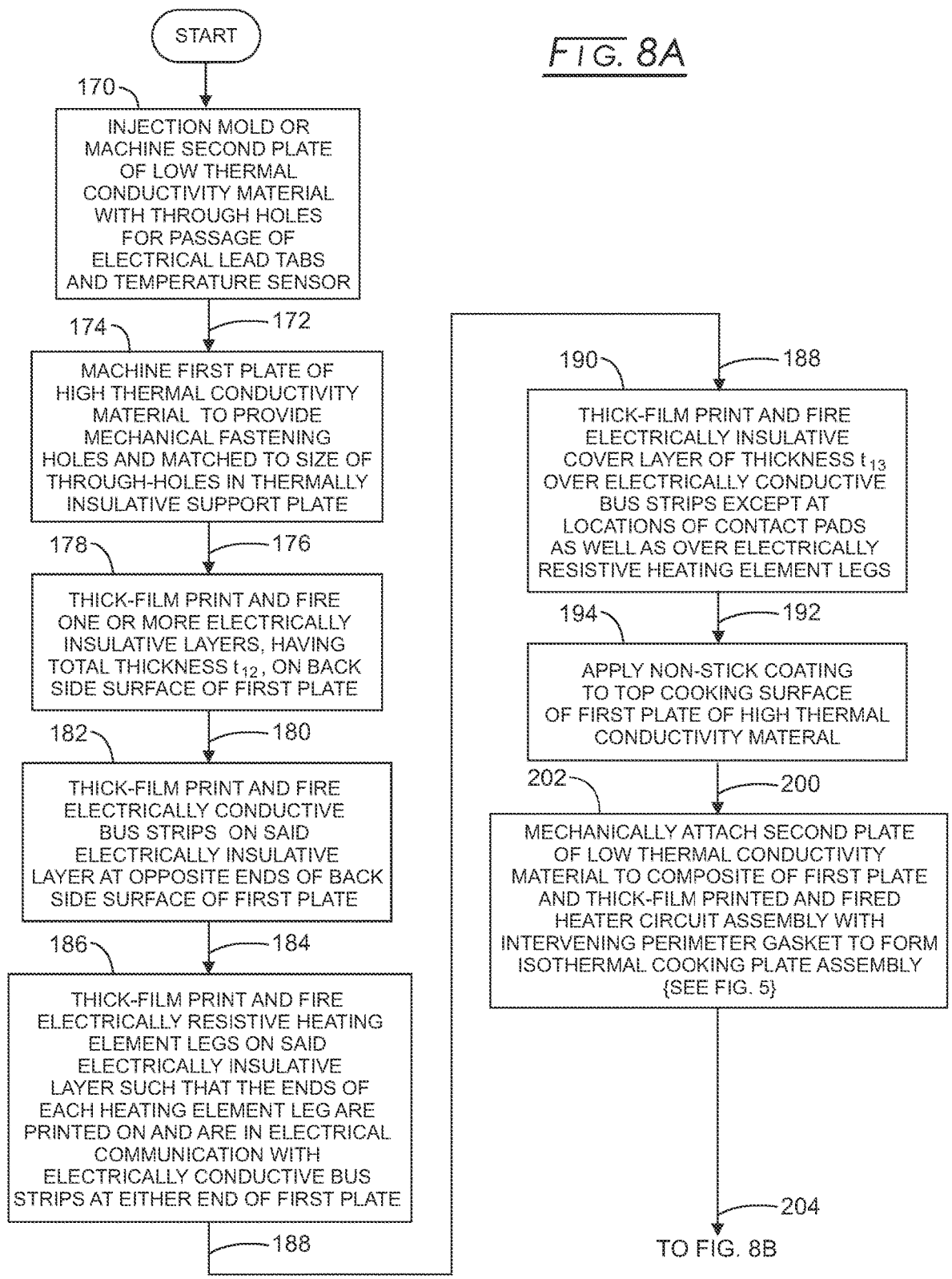

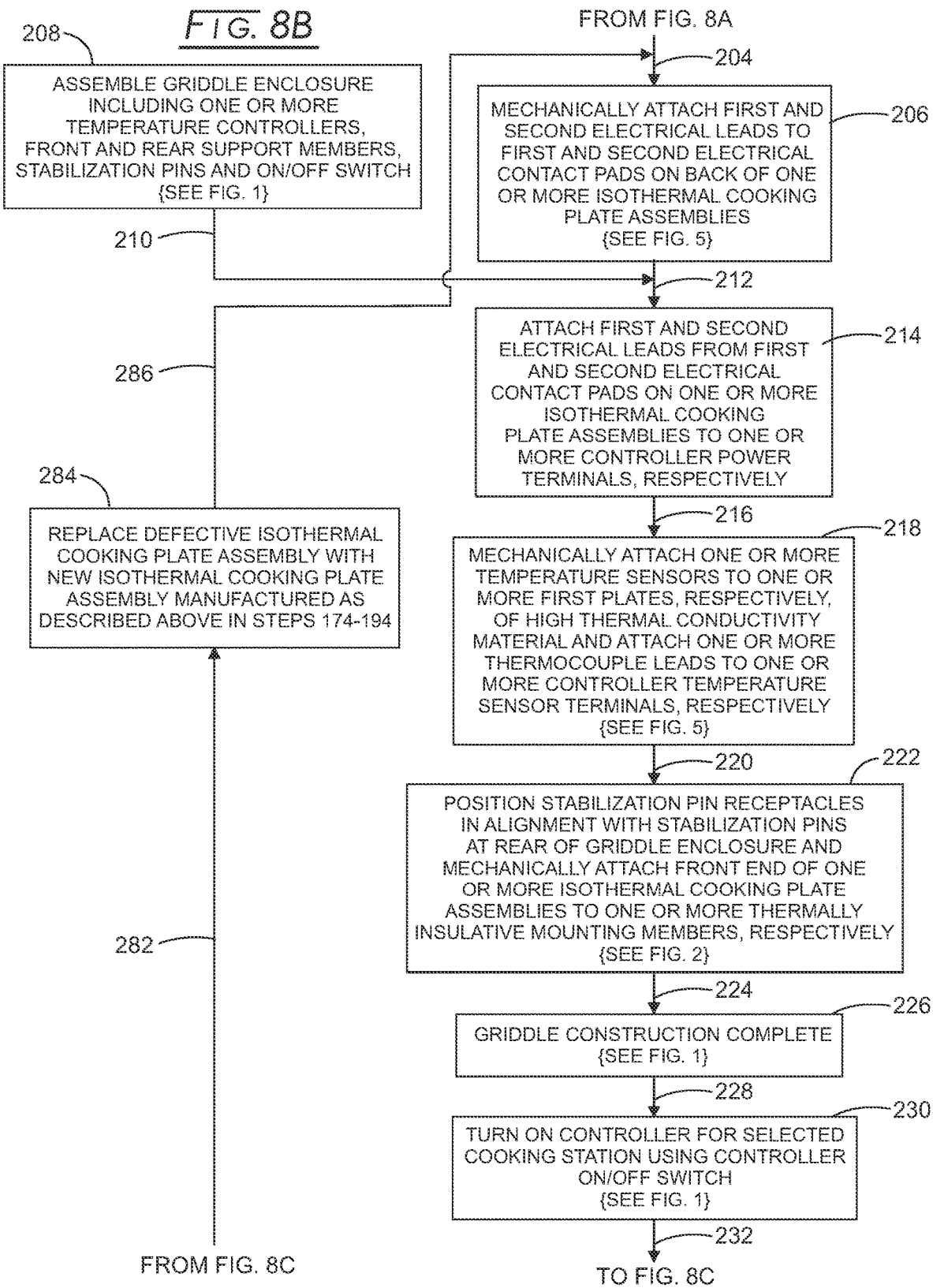

ISOTHERM COOKING PLATE APPARATUS, SYSTEM, AND METHOD OF MANUFACTURE

CROSS-REFERENCE TO RELATED APPLICATIONS

This application is a continuation-in-part of application Ser. No. 16/044,774 filed Jul. 25, 2018, now U.S. Pat. No. 10,995,959, which in turn is a continuation-in-part of application Ser. No. 14/526,570 filed Oct. 29, 2014, now abandoned, which claims benefit of provisional application Ser. No. 61/899,415 filed on Nov. 4, 2013; the disclosures of which are expressly incorporated herein by reference.

STATEMENT REGARDING FEDERALLY SPONSORED RESEARCH AND DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM

Not applicable.

STATEMENT REGARDING PRIOR DISCLOSURES BY THE INVENTOR OR A JOINT INVENTOR

Not applicable.

BACKGROUND OF THE INVENTION

The accurate temperature control of cooking plate assemblies, also known as griddles, is required for certain food processing wherein variable rates of heat dissipation exist across the extent of the cooking surface. Some applications would benefit from improved energy efficiency if the cooking surfaces could be raised from room temperature to the desired operating temperature within a very brief time period so that the cooking plate (or griddle) is only heated during the time period that the cooking of food is required. Furthermore, some applications require that the cooking plate assembly be suitable and safe for contact with objects, such as liquid or solid foods, and be resistant to damage by exposure to liquids and mechanical damage by contacting objects such as knives and other cooking implements. In addition, there is a need to provide a cooking surface comprising a non-stick coating to minimize the need for supplemental cooking liquids (e.g., cooking oils) and minimize the effort required to clean adhered food residue from the cooking surface following prior cooking processes.

Accordingly, there is a need to provide a durable cooking plate capable of delivering and thermally conducting a sufficient amount of heat to maintain a substantially uniform or isothermal temperature distribution across the extent of the cooking plate surface while maintaining a pre-selected temperature in the presence of rapidly and widely varying heat dissipation rates across the surface of the cooking plate. The need for an isothermal cooking plate assembly capable of maintaining a substantially uniform temperature is a critical food safety requirement to ensure the adequate cooking of meat and poultry (e.g., steak, ground meat, ground poultry, hamburger patty, sausage patty) since cooking for a predetermined time interval (i.e., "cook by time") for a given type of food and food article is widely used in fast-food kitchens, food trucks (i.e., trucks that contain mobile kitchens to prepare food at multiple customer walk-up sites) and hotel/motel hospitality food services. In this regard, an operator that typically has limited professional cooking skills utilizes a settable elapsed time device (i.e., timer) to determine when the food article being cooked on the griddle is either ready to be cooked on opposite uncooked side or that the food article is adequately cook to ensure the safe consumption of the food. Limiting the maximum difference between the operator-selected temperature and any region of the cooking plate in contact with food to 10 C. or less for the full range of cooking plate loading factors (i.e., fraction of cooking plate covered by food) and operator-selectable set-point temperatures up to 230 C (450 F) enables food to be cooked safely and consistently once the cooking duration parameter is initially confirmed through the simple measurement of the minimum internal temperature of the article of food using widely available meat thermometers. Once the required cooking duration is determined (using thermometry) that ensures that the minimum internal temperature of the food is cooked to an established safe temperature (e.g., 160 F or 71 C for the case of hamburger), then that determined cooking duration (e.g., 500 seconds) can be used in subsequent cooking of the same type and size of food article as long as the food cooking plate is known to be substantially equal to the operator selected set point (i.e., within 10 C or less of the operator selected set-point temperature).

A griddle system that incorporates an isothermal cooking plate assembly requiring only a brief period to heat up the first plate cooking surface from room temperature to an operator-selected set-point temperature, preferably within 30 seconds, is also needed since many applications involve "on demand" cooking of food, i.e., cooking of food when an individual order is received such as cooking food on a food truck or in the kitchen of a hotel/motel hospitality breakfast service. The ability to heat up the first plate of an isothermal cooking plate assembly of a griddle system within 30 seconds results in a significant savings of power and reduces environmental cooling requirements since the isothermal cooking plate assembly is heated to a cooking temperature (e.g., 150 C) for only the period of time during which the cooking of one or more articles of food is actually being performed. As a result, the ability to heat up the first plate of an isothermal cooking plate assembly of a griddle system within 30 seconds provides: [a] a reduction in the operator's food preparation time for a given food cooking request, [b] an increase in the number of customers that can be served per unit time (e.g., customers served per hour) and [c] a reduction in the cost for energy required for cooking food since electrical power is only being supplied to the isothermal cooking plate assembly of the griddle system at the time a request for cooked food is received (e.g., an food order is received for a cooked hamburger).

A griddle system that incorporates an isothermal cooking plate assembly requiring a source of electrical power having a voltage of only 115 volts at a maximum current of 20 amps is also needed since it would be useful in many settings such as hospitality food service kitchens of hotels and motels as well as food trucks and "mom and pop" short order kitchens that prepare food on demand (i.e., as orders are received). This capability eliminates the need for a special high-voltage 220-volt service installation that requires specially wiring within the walls or a custom external conduit to extends to a special high-voltage outlet and a special addition to the utility box to accommodate each dedicated 220-volt outlet.

In addition, there is a need to simplify the complexity of the cooking plate construction to increase its reliability and reduce its manufacturing costs to enable its use in high-volume cooking applications and enable rapid and convenient replacement of only the cooking plate assembly in the event of deterioration and loss of release characteristics of the non-stick coating, failure of the electrically resistive heating element and/or failure of temperature sensor without the need for replacing the cooking plate support structure, partial enclosure or temperature control electronics comprising the controller, temperature sensor, and power leads to the electrically resistive heating element.

An example embodiment of the present disclosure is a griddle system incorporating two independently controlled isothermal cooking plate assemblies. It is estimated that the total manufacturing cost for a griddle system having two independently controllable cooking stations is less than $1,000. At this manufacturing cost level, the finished product could be sold at a price level that could be accommodated by a wide range of food service operators including hospitality food service kitchens of hotels and motels as well as food trucks and "mom and pop" short order kitchens that prepare food on demand. In addition, the estimated cost for each independently controllable and readily replaceable isothermal cooking plate assembly is less than $200.

BRIEF SUMMARY OF THE INVENTION

The present disclosure is addressed to design for a griddle system comprising an isothermal cooking plate assembly, controller, griddle system and method of manufacture of the isothermal cooking plate assembly. As described more fully below, the present disclosure specifies the optimum design for a griddle system wherein one or more independently controlled isothermal cooking plate assemblies are optimized for [a] a maximum temperature difference between the operator-selected set-point temperature and any temperature within cooking plate in contact with food that does not exceed the set-point temperature by more than 10 C for all set-point temperatures, [b] a rapid heat-up from room temperature to the operator-selected set-point temperature of less than 30 seconds, [c] convenient use of readily available line power at a maximum current of 20 amps at 115 volts (i.e., standard capacity of most electrical outlets) and [d] convenient replacement of a low-cost isothermal cooking plate assembly in the field (e.g., replacement due to degradation over time of the non-stick coating or failure of the heating element) while reusing the griddle controller and support structure. The isothermal cooking plate assembly includes a first plate of high thermal conductivity material that advantageously may be Aluminum Type 1100 or Type 6061. The preferred material for first plate is Aluminum Type 1100 owing to its higher thermal conductivity of 2.18 watts/cm-C as compared Aluminum Type 6061 having a thermal conductivity of 1.67 watts/cm-C. The first plate has a substantially uniform thickness over the full extent of its surface used for cooking.

As used herein, the term "substantially uniform thickness" refers to the standard thickness tolerance for commercially available materials in the form of sheets. By way of example, Aluminum 1100 sheet stock is available from McMaster Carr (Cleveland, Ohio) in sheet sizes up to 48 inch×96 inch having a thickness of 0.190 inch and a thickness tolerance of +/−0.011 inch. At a sheet thickness of 0.250 inch, Aluminum 1100 sheet stock is available from McMaster Carr (Cleveland, Ohio) in sheet sizes up to 48 inch×96 inch having a thickness tolerance of +/−0.016 inch.

Based on the detailed heat transfer analyses performed as well as the calculation of heat up rates of alternative first plates of isothermal cooking plate assemblies, the commercially available thickness tolerances are sufficiently small that the computed temperature distributions of the first plate as well as the calculated rates of heat-up to the set-point temperature (e.g., 150 C) are effectively unchanged. For example, for an Aluminum 1100 first plate having a length of 7.9 inch and a width of 6.3 inch, the time required to heat up from 25 C to 150 C at a specified thickness of 0.187 inch and maximum power input of 115 volts at 20 amps (i.e., 2300 watts) is 20.8 seconds. If the Aluminum 1100 sheet having a nominal thickness of 0.187 inch is manufactured at the maximum commercially available thickness based on a thickness tolerance of +/−0.011 inch, then the heat up time for the maximum manufactured sheet thickness of 0.187 inch+0.011 inch or 0.198 inch is 22.0 seconds or 1.2 seconds longer than the heat up time for the first plate having a nominal sheet thickness of 0.187 inch.

The uniformly thick first plate of high thermal conductivity material may optionally be roll bonded on top cooking surface of first plate with a cladding layer, for instance, formed of austenitic stainless steel, such as a Type 304 and having a thickness of 0.002 to 0.010 inch. The corrosion-resistant and durable cladding (e.g., austenitic stainless steel) may be applied by roll bonding, plasma spray coating or vapor deposition processes. In addition, the hardness, wear resistance, corrosion resistance, and lubricity of the exterior surface of the stainless steel cladding may be further improved using metal finishing processes such as MED-COAT 2000™ provided by the Electrolyzing Corporation of Ohio (Cleveland, Ohio). Alternatively, the cooking surface of the first plate of high thermal conductivity material may coated with a corrosion resistant and durable surface layer applied by electroplating or electroless plating processes (e.g., nickel or chrome plated surface coating).

A non-stick coating may be advantageously disposed on and in good thermal communication with the top cooking surface of the first plate of high thermal conductivity material of the present disclosure to minimize the need for supplemental cooking liquids (e.g., cooking oils) and to minimize the effort required to clean adhered food residue from the top cooking surface following prior cooking processes. If a non-stick coating is disposed on and in good thermal communication with the top cooking surface of the first plate, its application and curing would occur only after all of the thick-film printing and firing steps for the first electrically insulative layer, second electrically resistive heating element, third electrically conductive bus strips, and optional fourth electrically insulative covering layer, as specified below.

As used herein, the term "firing" of glass-based, thick-film printed layers refers to an elevated-temperature process that functions to remove any residual organic carriers from the printed thick-film layer and during which the printed thick-film layer is bonded to its underlying substrate. For the case of thick-film layers containing electrically conducting particles or electrically resistive glass particles, the firing process enables the development of the intended electrically conductive or electrically resistive properties of the thick-film layer as a result of the coalescence of the filler particles.

A heater manufacturing method involves a first plate of thermally conductive material that is metallic on which is disposed one or more thick-film printable first electrically insulative layers incorporating a glass having a large coefficient of thermal expansion that can be thick-film printed on the back surface of the first plate opposite its top cooking surface. Each thick-film printable, glass-based first electrically insulative layer is then fired at a temperature, $T_{dielectric}$ that does not exceed the melting point of first aluminum plate, preferably fired at a temperature, $T_{dielectric}$ that does not exceed 600 C.

Following the firing of one or more thick-film printable first electrically insulative layers, two or more silver-filled, glass-based third electrically conductive bus strips are thick film printed onto the previously thick-film printed and fired first surface of the first electrically insulative layer, preferably oppositely disposed at the edges of the first plate to provide for electrical connections to the electrically resistive heating element legs as well as contact pads for electrical communication between the second electrically resistive heating element and removably attachable electrical leads extending from controller. The thick-film printed third electrically conductive bus strips are then fired at a temperature, $T_{bus-strip}$, that is lower than the temperature at which the thick-film printable first electrically insulative layer is fired, $T_{dielectric}$, in order to prevent migration of the third electrically conductive bus strips into the previously fired first electrically insulative layer in order to prevent an unwanted electrical conduction path between the third electrically conductive bus strips and the first plate. Preferably, the firing temperature for the thick-film printable third electrically conductive bus strips, $T_{bus-strip}$ is at least 50 C lower than the temperature at which the thick-film printable first electrically insulative layer is fired, $T_{dielectric}$.

Following the firing of two or more thick-film printable third electrically conductive bus strips, a second electrically resistive heating element layer incorporating glass that contains electrically conductive fillers is thick-film printed and fired on the previously thick-film printed and fired first surface of the fired first electrically insulative layer as well as extending onto the previously thick-film printed and fired electrically conductive bus strips to effect electrical communication between the second electrically resistive heating element layer legs and the electrically conductive bus strips. The second electrically resistive heating element layer then is fired at a temperature, $T_{heater}$, that is lower than the temperature at which the two or more thick-film printable thick-film printable electrically conductive bus strips, $T_{bus-strip}$ are fired. Preferably, the firing temperature for the thick-film printable second electrically resistive heating element layer, $T_{heater}$ is at least 50 C lower than the firing temperature at which the thick-film printable electrically conductive bus strips, $T_{bus-strip}$. In addition, an optional fourth electrically insulative covering layer may be deposited over the second electrically resistive heating element layer and the third electrically conductive bus strips.

By way of example, the firing temperatures for first electrically insulative layer, $T_{dielectric}$, third electrically conductive bus strips, $T_{bus-strip}$ and second electrically resistive heating element layer, $T_{heater}$ may be 550 C, 500 C and 450 C, respectively. In this manner, each successive firing temperature is sufficiently below the firing temperature used for the preceding layer that there is no migration of thick-film constituents into previously fired layers.

The thick-film printed and fired first electrically insulative layer of the present invention is an inorganic glass or glass-ceramic dielectric comprising a mixture of two or more oxides and exhibiting a large coefficient of thermal expansion, $\alpha_{dielectric}$ comparable to the coefficient of thermal expansion of aluminum, $\alpha_{aluminum}$ (viz., $21 \times 10^{-6}$ per degree C.). In this regard see Wilder, J. A., Glass Ceramics for Sealing to High Expansion Metals. Sandia National Laboratories 1980; Report No. SAND80-2192: 1-26. In this regard, also see U.S. Pat. Nos. 5,262,364 and 9,776,911.

In addition, the thick-film printed first electrically insulative layer of the present invention, following firing, can be further characterized by the measurable mechanical and thermal properties that include the fired material's [a] modulus of elasticity, $E_{dielectric}$, [b] thermal conductivity, $k_{dielectric}$ and [c] breaking strength of glass, $\alpha_{dielectric}$. As used herein, the breaking strength of glass refers to the measured and reported level of stress at which glass will fracture, crack or break.

As specified in the present invention, the thick-film printed and fired first electrically insulative layer provides the dual functions of [a] electrically isolating the second electrically resistive heating element legs and the third electrically conductive bus strips from the aluminum electrically and thermally conductive first plate and [b] thermally conducting heat generated within and from the second electrically resistive heating element legs to the aluminum electrically and thermally conductive first plate. The thick-film printed and fired first electrically insulative layer comprises a first surface at its interface with the thick-film printed and fired electrically resistive heating element legs. The thick-film printed and fired first electrically insulative layer comprises a second surface at its interface with the back surface of the first plate that is opposite the top cooking surface of the first plate. The first surface and second surface of the thick-film printed and fired first electrically insulative layer are separated by a distance, $t_{dielectric}$ that corresponds to the substantially uniform physical thickness of the thick-film printed and fired first electrically insulative layer.

For the general case of heat conduction through a solid having a substantially uniform thickness, t (In units of centimeters), the amount of heat conducted, Q (in units of watts) through an area, A (in units of square centimeters) is proportional to the thermal conductivity, k (in units of watts/sq·cm.-C) of the solid and the temperature difference $(T_1-T_2)$ across the thickness of the solid (in units of Centigrade degrees). The general equation for heat conduction through a solid having a substantially uniform thickness is provided below in Equation 1:

$$Q=\{k*A*(T_1-T_2)\}/t \qquad \text{(Equation 1)}$$

In this regard, see McAdams, W. H., Heat Transmission. 1954; McGraw-Hill Book Company, New York: page 12, Equation 2-6.

For the specific case of heat conduction through the thick-film printed and fired first electrically insulative layer of the present invention and based on the well-known heat conduction equation specified above in Equation 1, the amount of heat conducted through the thick-film printed and fired first electrically insulative layer, $Q_{heater}$ is provided below in Equation 1A:

$$Q_{heater}=\{k_{dielectric}*A_{heater}*(T_1'-T_2')\}/t_{dielectric} \qquad \text{(Equation 1A)}$$

The term for the area through which heat is conducted, $A_{heater}$ corresponds to the total area of the second electrically resistive heating element legs in direct thermal contact with the thick-film printed and fired first electrically insulative layer. The temperatures, $T_1'$ and $T_2'$ in Equation 1A correspond to the temperatures at the first surface and second surface of the electrically insulative layer, respectively.

For the specific case of heat conduction through the thick-film printed and fired first electrically insulative layer of the present invention, the resulting temperature difference, $(T_1'-T_2')$ across the thickness, $t_{dielectric}$ of the thick-film printed and fired first electrically insulative layer can be expressed in terms of the amount of heat conducted through the through the thick-film printed and fired first electrically insulative layer, $Q_{heater}$ as well as the area through which heat is conducted, $A_{heater}$, the thickness, $t_{dielectric}$ of the thick-film printed and fired first electrically insulative layer and the thermal conductivity, $k_{dielectric}$ of the thick-film printed and fired first electrically insulative layer as specified below in Equation 1B:

$$(T_1'-T_2') = \{Q_{heater}/A_{heater}\} * \{t_{dielectric}/k_{dielectric}\} \quad \text{(Equation 1B)}$$

As seen in Equation 1B, the larger the ratio, $\{Q_{heater}/A_{heater}\}$, also referred to hereinafter as the heat flux through the thick-film printed and fired first electrically insulative layer, the larger the resulting temperature difference, $(T_1'-T_2')$ across the thickness, $t_{dielectric}$ of the thick-film printed and fired first electrically insulative layer. Likewise, as seen in Equation 1B, the larger the ratio, $\{t_{dielectric}/k_{dielectric}\}$, the larger the resulting temperature difference, $(T_1'-T_2')$ across the thickness, $t_{dielectric}$ of the thick-film printed and fired first electrically insulative layer. As used herein, "heat flux" refers to the amount of resistive heating (i.e., Joulean heating) generated within the second electrically resistive heating element legs (e.g., in units of watts) divided by the total surface area of the electrically resistive heating element legs disposed on the first electrically insulative layer (e.g., in units of square centimeters or $cm^2$).

The functional significance of Equation 1B for the specific case of heat conduction through the thick-film printed and fired first electrically insulative layer of the present invention is apparent when the breaking strength of the glass thick-film printed and fired first electrically insulative layer, $\sigma_{dielectric}$ is quantified. As used herein, the breaking strength of the glass thick-film printed and fired first electrically insulative layer, $\sigma_{dielectric}$ refers to the applied stress at failure of the glass layer, i.e., the physical fracture, cracking and/or breaking apart of the first electrically insulative layer and its overlaying second electrically resistive heater layer and/or third electrically conductive bus strip layer.

In general, the thermal stress, $\sigma$ (in units of pounds per square inch) induced in a layer of material having a uniform thickness and that is exposed to a temperature difference, $(T_1-T_2)$ in units of Centigrade degrees can be expressed by the following equation:

$$\sigma = \{\alpha * E * (T_1-T_2)\}/(1-\mu) \quad \text{(Equation 1C)}$$

where $\alpha$ is the coefficient of thermal expansion of the material (in units of reciprocal degrees Centigrade), E is the modulus of elasticity or Young's modulus of the material (in units of pounds per square inch) and $\mu$ is Poisson's ratio for the material defined as the ratio of the change in the width per unit width of a material, to the change in its length per unit length, as a result of strain. In this regards, see Young, W. C and Budynas, R. G., Roark's Formulas for Stress and Strain. Seventh Edition 2002; McGraw-Hill Company, New York; Chapter 16.6 Thermal Stresses, page 758-764.

The general equation for thermal stress, $\sigma$ in a material, as seen in Equation 1 C, can be rearranged to express the temperature difference, $(T_1-T_2)$ as a function of the thermal stress, $\sigma$ as well as the coefficient of thermal expansion, $\alpha$, modulus of elasticity, E and Poisson's ratio, $\mu$, as follows:

$$(T_1-T_2) = \{\sigma*(1-\mu)\}/\{\alpha*E\} \quad \text{(Equation 1D)}$$

Referring to Equation 1D, if the thermal stress, $\sigma$ is replaced with the breaking strength of the glass thick-film printed and fired first electrically insulative layer, $\sigma_{dielectric}$ (corresponding to the applied stress, $\sigma$ at mechanical failure of the glass thick-film printed and fired first electrically insulative layer), then Equation 1D expresses the maximum allowable temperature difference, $(T_1-T_2)_{max}$ to avoid mechanical failure (e.g., fracture, cracking, breaking) of the glass thick-film printed and fired first electrically insulative layer as expressed below in Equation 1E:

$$(T_1'-T_2')_{max} = \{\sigma_{dielectric}*(1-\mu)\}/\{\alpha_{dielectric}*E_{dielectric}\} \quad \text{(Equation 1E)}$$

where the temperatures, $T_1'$ and $T_2'$ in Equation 1E correspond to the temperatures at the first surface and second surface of the electrically insulative layer, respectively and the terms $\alpha_{dielectric}$, $E_{dielectric}$ and $\mu$ are as defined in the preceding paragraphs. The maximum allowable temperature difference, $(T_1'-T_2')_{max}$ in Equation 1E is equivalent to and referred to hereinafter as the "Maximum Allowable Thermal Stress in the First Electrically Insulative Layer".

Combining the temperature difference, $(T_1'-T_2')$ associated with heat conduction through the glass thick-film printed and fired first electrically insulative layer of the present invention, as seen in Equation 1B with the above expression for the maximum allowable temperature difference, $(T_1'-T_2')_{max}$ seen in Equation 1E provides an expression for the "Maximum Allowable Thermal Gradient in the First Electrically Insulative Layer" as specified in Equation 1E. Since both Equation 1B and Equation 1E are equal to the same temperature difference, $(T_1'-T_2')$, then, by identity, Equation 1B and Equation 1E can be combined a specified in Equation 1F:

$$\{Q_{heater}/A_{heater}\}*\{t_{dielectric}/k_{dielectric}\} = \{\sigma_{dielectric}*(1-\mu)\}/\{\alpha_{dielectric}*E_{dielectric}\} \quad \text{(Equation 1F)}$$

The term $\{Q_{heater}/A_{heater}\}*\{t_{dielectric}/k_{dielectric}\}$ refers to the "Maximum Allowable Thermal Gradient in the First Electrically Insulative Layer" that can be induced in the thick-film printed and fired glass first electrically insulative layer without inducing fracture, cracking and/or breaking of the first electrically insulative layer and associated failure of the thick-film printed and fired heater circuit assembly. As seen in Equation 1F, for a given maximum heat flux, $Q_{heater}/A_{heater}$ through the glass thick-film printed as well as the thickness, $t_{dielectric}$ and thermal conductivity, $k_{dielectric}$ of the fired first electrically insulative layer, the Maximum Allowable Thermal Gradient in the First Electrically Insulative Layer corresponding expressed by the term $\{Q_{heater}/A_{heater}\}*\{t_{dielectric}/k_{dielectric}\}$ can be equated to the term $\{\sigma_{dielectric}*(1-\mu)\}/\{\alpha_{dielectric}*E_{dielectric}\}$.

Hence, based on the published (nominal) values for the breaking strength of the glass thick-film printed and fired first electrically insulative layer, $\sigma_{dielectric}$ as well as the nominal values for the coefficient of thermal expansion, $\alpha_{dielectric}$, modulus of elasticity, $E_{dielectric}$ and Poisson's ratio, $\mu$, the value for the Maximum Allowable Thermal Gradient in the First Electrically Insulative Layer can be explicitly determined. The value for the Maximum Allowable Thermal Gradient in the First Electrically Insulative Layer, based on the right-hand side of Equation 1F, can be calculated using measured glass properties.

The calculated value for the Maximum Allowable Thermal Gradient in the First Electrically Insulative Layer based on measured glass properties is also equivalent to the maximum value for the term $\{Q_{heater}/A_{heater}\}*\{t_{dielectric}/k_{dielectric}\}$ as seen in Equation 1B. The maximum allowed value of the term $\{Q_{heater}/A_{heater}\}*\{t_{dielectric}/k_{dielectric}\}$ explicitly determines the maximum allowed value for the thickness, $t_{dielectric}$ based on the maximum applied heat flux, $Q_{heater}/A_{heater}$ through the glass thick-film printed and fired first electrically insulative layer during heat-up of the first plate and the thermal conductivity, $k_{dielectric}$ of the glass thick-film printed and fired first electrically insulative layer.

The thickness of the first plate of high thermal conductivity material of the isothermal cooking plate assembly is optimized to [a] provide the thermal conductance required to maintain a substantially uniform temperature across the entire surface of the first plate in the presence of varying heat dissipation rates across the entire surface of the first plate while [b] minimizing the time required to heat up the first plate of the isothermal cooking plate assembly to the user-selected set-point temperature. The thermal conductance between the electrically resistive heating element and the first plate is selected to be sufficiently high to enable the first plate to be heated to the selected set-point temperature within several tens of seconds. By way of example, the first plate of the present disclosure can be heated from room temperature to 150 C within less than 30 seconds for resistive heating elements energized with a maximum applied alternating current of 20 amps at an applied line voltage of 115 volts.

The operating temperature of the first plate of the isothermal cooking plate assembly of the present disclosure may be fixed or may be operator selectable and controlled with a temperature feedback control system design. The temperature feedback control system design utilizes a temperature sensor (e.g., thermocouple) that is in thermal communication with the first plate to regulate the application of power to a heater circuit assembly to maintain the first plate at the operator selected set-point (i.e., cooking) temperature. This controller design incorporating a temperature sensor is referred to hereinafter as temperature feedback control.

A thick-film printing process is used to first print one or more glass or glass-based first electrically insulative layers on the first surface of the first plate. The maximum level of heat flux, $\{Q_{heater}/A_{heater}\}$ transferred through the glass thick-film printed and fired first electrically insulative layer corresponds to the heat flux level that occurs during the initial rapid heat-up of the first plate to the operator selected set point temperature (e.g., 150 C). The maximum allowed value for the thickness, $t_{dielectric}$ of the glass thick-film printed and fired first electrically insulative layer represents the maximum allowable thickness of the first electrically insulative layer that avoids the fracture, cracking and/or breaking of the thick-film printed and fired first electrically insulative layer during rapid heat-up of the aluminum first plate. The maximum allowed value for the thickness, $t_{dielectric}$ of the glass thick-film printed and fired first electrically insulative layer can be calculated by rearranging the terms in Equation 1F as seen below in Equation 1G:

$$\{Q_{heater}/A_{heater}\}*\{t_{dielectric}/k_{dielectric}\}=\{\sigma_{dielectric}*(1-\mu)\}/\{\alpha_{dielectric}*E_{dielectric}\}t_{dielectric}=\{\sigma_{dielectric}*(1-\mu)\}/\{\alpha_{dielectric}*E_{dielectric}\}*\{k_{dielectric}/(Q_{heater}/A_{heater})\}$$

Equation 1G

As seen in Equation 1G, maximum allowed value for the thickness, $t_{dielectric}$ of the glass thick-film printed and fired first electrically insulative layer can be calculated based on the known maximum level of applied heat flux, $\{Q_{heater}/A_{heater}\}$ and thermal conductivity, $k_{dielectric}$ of the glass thick-film printed and fired first electrically insulative layer as well as the known properties of glass including the breaking strength of glass, $\sigma_{dielectric}$, modulus of elasticity, $E_{dielectric}$, coefficient of thermal expansion, $\alpha_{dielectric}$ and Poisson's ratio, $\mu$.

The incorporation a first plate of high thermal conductivity material (e.g., Aluminum Type 1100) provides heat conduction throughout the extent of the plane of the first plate so that regions of higher heat dissipation in contact with food and required for cooking receive thermal power [a] by heat conduction across the thickness of the first plate from the electrically resistive heating element positioned directly opposite the region of higher heat dissipation and [b] by lateral heat conduction within in the plane of the first plate of high thermal conductivity material from the electrically resistive heating elements located in the regions surrounding the region of higher heat dissipation.

The side of the first plate of high thermal conductivity material opposite the top cooking surface and containing the thick-film printed and fired heater circuit assembly may be thermally insulated to reduce unwanted heat loss from the side of the first plate that is opposite the top cooking surface. By way of example, a rigid second plate of low thermal conductivity material covers the entire surface of the first plate of high thermal conductivity material on the side opposite the top cooking surface. The second plate of low thermal conductivity material (i.e., thermally insulative material) may be selected from the family of plastic materials including, for example, polyphenylene sulfide, polyamide-imide, polyetherimide, and polyetheretherkeytone offering low thermal conductivity, durability, and capability to withstand continuous operation at temperatures of 200 C or greater. An air gap is introduced between the back side of the thermally conductive first plate on which the heater circuit assembly is disposed and the front side of the thermally insulative second plate in order to reduce heat losses from the back side of the first plate. By way of example, the thermally insulative second plate may be attached to the first plate using an intervening high-temperature gasket material around the perimeter (e.g., silicone gasket) to effect a small air gap (e.g., 0.1 to 0.2 inch) between the plates, thereby providing high thermal impedance and low heat loss from the heater side of the first plate due to the very low thermal conductivity of air. Alternatively, the front side of the thermally insulative second plate may be positioned opposite the back side of the thermally conductive first plate on which the heater circuit assembly is disposed with an air gap while not mechanically attached to the first plate.

Further disclosed is an example method for manufacturing an isothermal cooking plate assembly having first plate, thick-film printed and fired heater circuit assembly and second plate that functions as both a thermal insulation covering over the back side (i.e., side opposite the cooking surface of first plate) of first plate as well as a support for first plate. The method of manufacture includes the steps:

providing first plate of high thermal conductivity material;

providing one or more thick-film printed and fired first electrically insulative layers disposed on the side opposite the cooking surface of first plate, the total thickness of the one or more first electrically insulative layers, after firing, selected to be sufficiently small and the associated temperature gradient through the first electrically insulative layer is sufficiently small during the application of the maximum heat flux level during rapid heat-up to prevent fracture, cracking and/or breaking of the first electrically insulative layer during rapid heat-up of first plate to a set-point temperatures of at least 150 C;

providing a thick-film printed and fired second resistive heating element heater trace layer;

providing a thick-film printed and fired third lead pattern layer on first electrically insulative layer using electrically conductive thick-film ink;

providing an optional thick-film printed and fired fourth electrically insulative layer on resistive heating element heater traces;

providing an optional fifth low-emittance coating layer deposited on the surface of thick-film printed and fired fourth electrically insulative layer;

mechanically attaching composite of thermally conductive first plate and thick-film printed and fired heater circuit assembly to a thermally insulative second plate to form an isothermal cooking plate assembly; and mechanically attaching isothermal cooking plate assembly within griddle system containing controller and attaching temperature sensor and heater circuit assembly electrical leads extending from controller.

The disclosure, accordingly, comprises the apparatus, method, and system possessing the construction, combination of elements, arrangement of parts and steps, which are exemplified in the following detailed description.

BRIEF DESCRIPTION OF THE SEVERAL VIEWS OF THE DRAWINGS

For a fuller understanding of the nature and advantages of the present method and process, reference should be made to the following detailed description taken in connection with the accompanying drawings, in which:

FIG. 1A is a pictorial representation of receptacle for collection of excess oil/fat and cooking debris discharged at right side of griddle system;

FIG. 7 is a bottom view of second plate of low thermal conductivity material showing through holes for socket head screws and passage of electrical leads extending from first and second contact pads at opposite ends of thick-film printed and fired heater circuit assembly;

FIG. 7A is a side view of the second plate in FIG. 7;

FIGS. 8A-8C combine as labeled thereon to provide a flow chart describing the manufacture and use of isothermal cooking plate assembly as at FIGS. 1, 2, 5, and 6;

Figure 1:
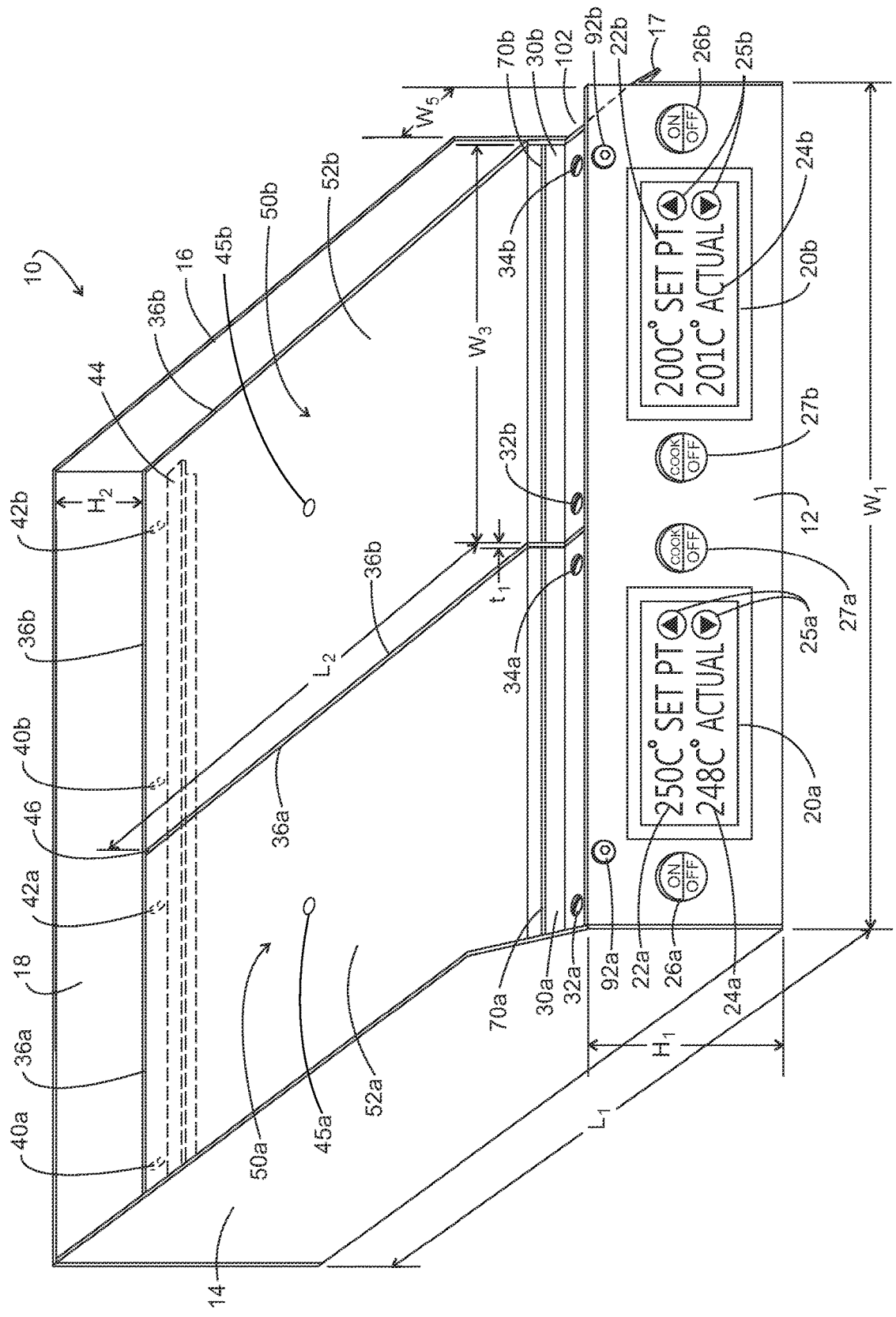
FIG. 1 is a pictorial representation of a two-station griddle comprising two isothermal cooking plate assembly assemblies.

The drawings will be described in greater detail below.

DETAILED DESCRIPTION OF THE INVENTION

In the disclosure to follow, initially described is an isothermal cooking plate assembly incorporating a thermally conductive aluminum first plate having a uniform thickness, which is covered by and in good thermal communication with a durable non-stick coating on the cooking-surface side. The thermally conductive cooking plate is heated by thick-film printed and fired electrically resistive circuit elements combined with thick-film printed and fired electrically conductive leads, both disposed upon a first electrically insulative layer. An optional electrically insulative layer may be disposed over the electrically resistive circuit elements and electrically conductive leads. The first electrically insulative layer, after firing, comprising one or more thick-film printed and fired electrically insulative layers, is selected to be sufficiently small and the associated temperature gradient through the first electrically insulative layer is sufficiently small during the application of the maximum power level and heat flux during rapid heat-up to prevent fracture, cracking and/or breaking of the first electrically insulative layer due during the rapid heat-up of first plate to set-point temperatures of at least 150 C.

Heat transfer analyses and heat-up rate analyses are performed on alternative first plate designs to determine the range of first plate dimensions that achieve the primary objectives of [a] an isothermal cooking plate assembly in which the temperature of the one or more regions or zones of the first plate in contact with the food being cooked remain substantially equivalent to the operator-selected setpoint temperature (e.g., 150 C) and [b] an isothermal cooking plate assembly in which the first plate heats up from room temperature (e.g., 25 C) to the operator-selected set-point temperature (e.g., 150 C) within a brief period of time (e.g., a period not exceeding 30 seconds). For the sake of clarity, it should be emphasized that computer program based heat transfer analyses confirm that regions of the first plate not in contact with food can rise more than 10 C above the set-point temperature, since they are only in contact with air. However, their operation beyond "isothermal" conditions specified herein (i.e., within 10 C of the set-point temperature) are of no consequence since only regions of the first plate in contact with food affect the intended cooking of the food whose rate depends on the temperature of the first plate subregions in contact with the one or more articles of food.

Returning to Equation 1F, the term $\{Q_{heater}/A_{heater}\}*\{t_{dielectric}/k_{dielectric}\}$ refers to the Maximum Allowable Thermal Gradient in the First Electrically Insulative Layer" that can be induced in the glass thick-film printed and fired first electrically insulative layer without inducing fracture, cracking and/or breaking of the first electrically insulative layer and associated failure of the thick-film printed and fired heater circuit assembly. As seen in Equation 1F, for a given maximum heat flux, $Q_{heater}/A_{heater}$ through the glass thick-film printed and fired first electrically insulative layer, the value of the Maximum Allowable Thermal Gradient in the First Electrically Insulative Layer, as specified by the term $\{Q_{heater}/A_{heater}\}*\{t_{dielectric}/k_{dielectric}\}$ can be determined by calculating the maximum allowable temperature difference $\{T_1-T_2\}_{max}$ between the first surface and second surface of the first electrically insulative layer. The maximum allowable temperature difference $\{T_1-T_2\}_{max}$ is calculable using equation 1E and given by the term $\{\sigma_{dielectric}*(1-\mu)\}/\{\alpha_{dielectric}*E_{dielectric}\}$.

Values for the breaking strength of glass, $\sigma_{dielectric}$ (in units of pounds/square inch or psi) have been measured by Preston as a function of the duration of the stress, sd (in units of microseconds) using the equation:

$$\sigma_{dielectric} = 65,000/\{\log_{10}(sd/6)\} \quad \text{(Equation 1H)}$$

In this regard, see Preston, F. W., The Mechanical Properties of Glass. Journal of Applied Physics 1942; 13: 623-634 and Preston, F. W., Strength of Glass and Duration of Stressing. Nature 1945; 3950:55. For the case of the application of the maximum heat flux through the first electrically insulative layer during a 30 second heat-up period (i.e., maximum stress duration period of 30 seconds), the calculated breaking stress of glass, $\sigma_{dielectric}$ is 9,700 psi. Another reported practical value for the breaking strength of glass, $\sigma_{dielectric}$ is 10,000 psi as reported by R. Lehman (see Lehman, R., The Mechanical Properties of Glass. Glass Engineering Course 150:312 at Rutgers State University of New Jersey 2000). Yet another practical value for the breaking strength of glass, $\sigma_{dielectric}$ is 11,000 psi at atmospheric pressure for a 30 second stress duration period during heat-up of 30 seconds during which the maximum heat flux is applied through the first electrically insulative layer (see Shand, E., Experimental Study of Fracture of Glass: I, The Fracture Process, Journal of American Ceramic Society 1954; 37 (12); 559-572). Based on published values, the nominal breaking strength of glass, $\sigma_{dielectric}$ is about 10,000 psi. The term "practical breaking strength" is used to distinguish the glass breaking strengths in actual applications from the theoretical breaking strength of glass that is based on the stress required to break chemical bonds in glass. The practical breaking strength of glass is orders of magnitude lower than the theoretical breaking strength due to the unavoidable presence of defects and flaws within actual glass layers.

The maximum allowable temperature difference $\{T_1-T_2\}_{max}$ specified in Equation 1E also includes other terms including the coefficient of thermal expansion, $\alpha_{dielectric}$, modulus of elasticity, $E_{dielectric}$ and Poisson's ratio, $\mu$. In the present invention, the coefficient of expansion, $\alpha_{dielectric}$ is required to closely match the coefficient of thermal expansion of aluminum (viz., $21 \times 10^{-6}$ per degree C.). In this regard, glasses are reported having coefficients of thermal expansion ranging from 16 to $21 \times 10^{-6}$ per degree C. that are intended for bonding to aluminum. In this regard, see U.S. Pat. No. 5,262,364 and Wilder, J. A., Glass Ceramics for Sealing to High Expansion Metals. Sandia National Laboratories 1980; Report No. SAND80-2192:1-26.

Values for the modulus of elasticity, $E_{dielectric}$ (also known as Young's modulus) for glasses have also been reported to be in the range $9.2 \times 10^6$ psi to $10.3 \times 10^6$ psi. In this regard, see Matsuda, J., Studies on the Young's Modulus of Silicate Glass as a Function of Temperature. Review of Physical Chemistry of Japan 1960; 30 (1):9-24 and Preston. F. W., The Mechanical Properties of Glass. Journal of Applied Physics 1942; 13: 623-634. In addition, the modulus of elasticity, $E_{dielectric}$ for glasses having a large coefficient of thermal expansion is reported to range from $10.2 \times 10^6$ to $10.3 \times 10^6$ psi. In this regard, see Thermal Loads on Optical Glass. Schott Technical Information-Advanced Optics October 2018; TIE-32: 1-6.

The value for Poisson's ratio for glasses having a large coefficient of thermal expansion (e.g., $13 \times 10^{-6}$ to $14 \times 10^{-6}$ per degree Centigrade) is reported to be 0.30 (see Thermal Loads on Optical Glass. Schott Technical Information-Advanced Optics October 2018; TIE-32: 1-6). Also, the value for Poisson's ratio for glass has been reported to be 0.25 (see Preston. F. W., The Mechanical Properties of Glass. Journal of Applied Physics 1942; 13: 623-634). In addition, Poisson's ratios for 12 different glasses are reported to range from 0.26 to 0.30 (see Kannappan, A., et. al., Elastic and Mechanical properties of Glass Specimen by Ultrasonic Method. Asian Research Publishing Network Journal of Engineering and Applied Sciences 2009; 4(1): 27-31).

The nominal properties values for glass including the [a] breaking strength of glass, $\sigma_{dielectric}$, [b] modulus of elasticity, $E_{dielectric}$ of glass, [c] coefficient of thermal expansion, $\alpha_{dielectric}$ of glass that matches the coefficient of thermal expansion of aluminum and [d] Poisson's ratio, $\mu$ for glass can be combined in Equation 1E to calculate the maximum allowable temperature difference $\{T_1-T_2\}_{max}$. The maximum allowable temperature difference $\{T_1-T_2\}_{max}$ corresponds to the temperature of the first surface, $T_1'$ and the temperature of the second surface, $T_2'$ of the first electrically insulative layer. The value for the Maximum Allowable Thermal Gradient in the First Electrically Insulative Layer, $\{T_1-T_2\}_{max}$ is calculated, as follows:

$$(T'_1-T'_2)_{max} = \{\sigma_{dielectric}*(1-\mu)\}/\{\alpha_{dielectric}*E_{dielectric}\}$$

$$(T'_1-T'_2)_{max} = \{10,000 psi*(1-0.30)\}/\{21 \times 10^{-6}/C*9.7 \times 10^6 psi\}$$

$$(T'_1-T'_2)_{max} = 34.4 C$$

Returning to Equation 1B, this equation can be rearranged so the maximum allowed thickness, $t_{dielectric}$ of the thick-film printed and fired first electrically insulative layer can be expressed in terms of Maximum Allowable Thermal Gradient in the First Electrically Insulative Layer, $\{T_1-T_2\}_{max}$, the heat flux, $Q_{heater}/A_{heater}$ and the thermal conductivity, $k_{dielectric}$ of the thick-film printed and fired first electrically insulative layer as seen in Equation 1I:

$$(T_1'-T_2')=\{Q_{heater}/A_{heater}\}*\{t_{dielectric}/k_{dielectric}\}$$

$$t_{dielectric}=\{(T_1'-T_2')*k_{dielectric}\}/\{Q_{heater}/A_{heater}\} \quad \text{(Equation 1I)}$$

The calculated Maximum Allowable Thermal Gradient in the First Electrically Insulative Layer, $\{T_1-T_2\}_{max}$ can next be substituted into the above Equation 1I for the maximum allowed thickness, $t_{dielectric}$ of the thick-film printed and fired first electrically insulative layer as seen in Equation 1J:

$$t_{dielectric}=\{34.4*k_{dielectric}\}/\{Q_{heater}/A_{heater}\} \quad \text{(Equation 1J)}$$

Example 1

Figure 3:
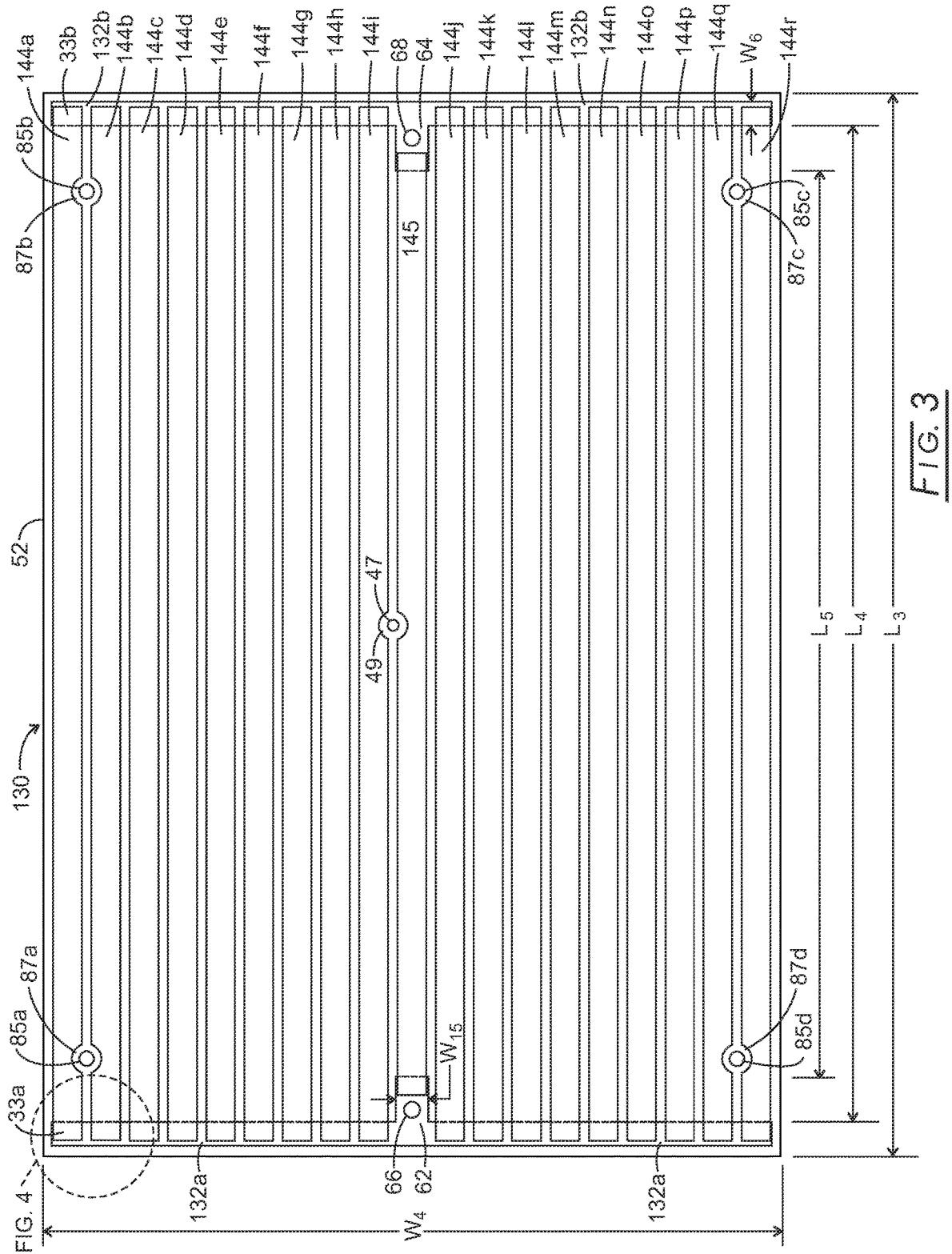
FIG. 3 top view of heater circuit assembly comprising [a] a first electrically insulative layer that is thick-film printed and fired on the back surface of the first plate opposite its top cooking surface followed by the selective screen printing and firing of [b] a second electrically resistive heating element layer (utilizing screen printable inks of higher electrical resistivity) on the first electrically insulative layer, [c] third electrically conductive bus strips (utilizing screen printable inks of lower electrical resistivity) in electrical communication with the heating element (optional fourth electrically insulative covering layer and optional fifth low-emittance coating layer not shown)

In this first example, as seen in Equation 1J, the maximum allowed thickness, $t_{dielectric}$ of the thick-film printed and fired first electrically insulative layer is determined based on the thermal conductivity, $k_{dielectric}$ of the thick-film printed and fired first electrically insulative layer and the maximum applied heat flux, $\{Q_{heater}/A_{heater}\}$ during the rapid heat-up of the first plate. By way of this first example, the overall dimensions of a first plate of an isothermal cooking plate assembly of a griddle system are 6.0 inches×9.0 inches. The total area of 19 thick-film printed and fired second electrically resistive heating element legs (as seen in FIG. 3) disposed on the thick-film printed and fired first electrically insulative layer that covers substantially the entire back surface of first plate is 48.0 square inches (309.6 sq·cm.). Due to the necessary spacing between second electrically resistive heating element legs, the total area of 19 thick-film printed and fired second electrically resistive heating element legs is less than the total area of the first plate of an isothermal cooking plate assembly of a griddle system. Based on a maximum applied power of 2300 watts (corresponding to the application of a nominal line voltage of 115 volts at 20 amps) during the heat up of the specified first plate of an isothermal cooking plate assembly of a griddle system, the maximum applied heat flux, $\{Q_{heater}/A_{heater}\}$ is 2300 watts/309.6 sq·cm. or 7.43 watts/sq·cm.

Continuing with this first example, a first preferred commercially available material for the thick-film printed and fired first electrically insulative layer is the AS100 dielectric paste manufactured by DuPont Microcircuit Materials, Research Triangle Park, North Carolina. This dielectric paste, developed for thick-film printing and firing on aluminum substrates, has a coefficient of thermal expansion, $\alpha_{dielectric}$ that closely matches the coefficient of thermal expansion of aluminum (viz., $21\times10^{-6}$ per degree C.). The measured thermal conductivity of the thick-film and fired AS100 dielectric material is 0.0016 watts/cm-C, as reported in the DuPont AS100 Technical Data Sheet issued by DuPont Microelectronic Materials in August 2014. The above Equation 1I for the maximum allowed thickness, $t_{dielectric}$ of the thick-film printed and fired first electrically insulative layer, as specified above in Equation 1J, can be expressed as follows:

$$t_{dielectric}=\{34.4*k_{dielectric}\}/\{Q_{heater}/A_{heater}\}$$

$$t_{dielectric}=\{34.4*0.0016 \text{ watts/cm-C}\}/7.43 \text{ watts/sq·cm.}$$

$$t_{dielectric}=0.0074 \text{ cm}=0.0029 \text{ inch}$$

Based on the above first example, a thick-film printed and fired first electrically insulative layer having a coefficient of thermal expansion, $\alpha_{dielectric}$ substantially the same as the aluminum first plate and nominal values for glass (viz., breaking strength, $\sigma_{dielectric}$ equal to 10,000 psi, modulus of elasticity, $E_{dielectric}$ equal to $9.2\times10^6$ psi and Poisson's ratio, $\mu$ equal to 0.3), a thermal conductivity of 0.0016 watts/cm-C and a maximum heat flux of 7.43 watts/sq·cm., the thickness, $t_{dielectric}$ of the thick-film printed and fired first electrically insulative layer should not exceed 0.0029 inch in order to avoid fracture, cracking and/or breaking of the first thermally insulative layer.

However, to avoid "pin-holes" in the electrically insulative layer (i.e., very small defects due to incomplete coverage of the substrate by the thick-film and fired electrically insulative layer), the manufacturer of this thick-film dielectric paste specifies thick-film printing and firing a first layer of the thick-film printed electrically insulative layer followed by a second thick-film printing and firing of the electrically insulative layer resulting in a total thickness of 0.0014 inch (35 microns). In this regard, see DuPont AS100 Technical Data Sheet issued by DuPont Microcircuit Materials in August 2014. This two stage thick-film printing and firing process eliminates the possibility of "pin hole" defects in the overall first electrically insulative layer, thereby eliminating unwanted electrical current flow paths through the first electrically insulative layer. In this first example, the total thickness of the thick-film printed and fired electrically insulative layer having two layers (viz., 0.0014 inch) is substantially less than the maximum allowable thickness, $t_{dielectric}$ for this example thick-film printed and fired heater circuit assembly (viz., 0.0029 inch), thereby avoiding the possibility of fracture, cracking and/or breaking of the first thermally insulative layer.

Example 2

In this second example, as seen in Equation 1J, the maximum allowed thickness, $t_{dielectric}$ of the thick-film printed and fired first electrically insulative layer is determined by the thermal conductivity, $k_{dielectric}$ of the thick-film printed and fired first electrically insulative layer and the maximum applied heat flux, $\{Q_{heater}/A_{heater}\}$. By way of this second example, the overall dimensions of a first plate of an isothermal cooking plate assembly of a griddle system are 6.0 inches×9.0 inches. The total area of 19 thick-film printed and fired second electrically resistive heating element legs (as seen in FIG. 3) disposed on the thick-film printed and fired first electrically insulative layer that covers substantially the entire back surface of first plate is 48.0 square inches (309.6 sq·cm.). Due to the necessary spacing between second electrically resistive heating element legs, the total area of 19 thick-film printed and fired second electrically resistive heating element legs is less than the total area of the first plate of an isothermal cooking plate assembly of a griddle system Based on a maximum applied power of 2300 watts (corresponding to the application of a nominal line voltage of 115 volts at 20 amps) during the heat up of the specified first plate of an isothermal cooking plate assembly of a griddle system, the maximum applied heat flux, $\{Q_{heater}/A_{heater}\}$ is 2300 watts/309.6 sq·cm. or 7.43 watts/sq·cm.

Continuing with this second example, a second preferred commercially available material for the thick-film printed and fired first electrically insulative layer is the IP6075 dielectric paste manufactured by Heraeus Electronics, Heraeus Deutschland GmbH & Co. KG, Hanau, Germany. This dielectric paste, developed for thick-film printing and firing on aluminum substrates, has a coefficient of thermal expansion, $\alpha_{dielectric}$ that closely matches the coefficient of thermal expansion of aluminum (viz., $21 \times 10^{-6}$ per degree C.). The measured thermal conductivity of the thick-film and fired IP6075 dielectric material is 0.0010 watts/cm-C, as reported in the Celcion IP6075 Technical Data Sheet issued by Heraeus Electronics in 2016. The above Equation 1I for the maximum allowed thickness, $t_{dielectric}$ of the thick-film printed and fired first electrically insulative layer, as seen in Equation 1J, can be expressed as follows:

$$t_{dielectric} = \{34.4 * k_{dielectric}\} / \{Q_{heater}/A_{heater}\}$$

$$t_{dielectric} = \{34.4 * 0.0010 \text{ watts}/cm\text{-}C\}/7.43 \text{ watts/sq·cm}.$$

$$t_{dielectric} = 0.0046 \text{ cm} = 0.0018 \text{ inch}$$

Based on the above second example, a thick-film printed and fired first electrically insulative layer having a coefficient of thermal expansion, $\alpha_{dielectric}$ substantially the same as the aluminum first plate and nominal values for glass (viz., breaking strength, $\sigma_{dielectric}$ equal to 10,000 psi, modulus of elasticity, $E_{dielectric}$ equal to $9.2 \times 10^6$ psi and Poisson's ratio, $\mu$ equal to 0.3), a thermal conductivity of 0.0010 watts/cm-C and a maximum heat flux of 7.43 watts/sq·cm., the thickness, $t_{dielectric}$ of the thick-film printed and fired first electrically insulative layer must not exceed 0.0018 inch in order to avoid fracture, cracking and/or breaking of the first thermally insulative layer.

However, to avoid "pin-holes" in the electrically insulative layer (i.e., very small defects due to incomplete coverage of the substrate by the thick-film and fired electrically insulative layer), it is common to thick-film print and fire a first layer of the thick-film printed electrically insulative layer followed by a second and optionally a third thick-film printed and fired electrically insulative layer to eliminate the possibility of "pin hole" defects in the overall first electrically insulative layer, thereby eliminating unwanted electrical current flow paths through the first electrically insulative layer.

The minimum thickness of each thick-film printed and fired electrically insulative layer is specified by the thick-film paste manufacturer to be 0.0008 inch (20 microns). Consequently, the requirement to thick film print and fire a second layer of the electrically insulative layer will result in a total thickness of the first electrically insulative layer, $t_{dielectric}$ following the second thick film printing and firing of an electrically insulative layer of 0.0016 inch. In this regard, see Celcion IP6075 Technical Data Sheet issued by Heraeus Electronics in 2016. This total thickness of the first electrically insulative layer, $t_{dielectric}$ comprising two thick-film printed and fired layers is less than maximum allowable thickness, $t_{dielectric}$ for this example thick-film printed and fired heater circuit assembly (viz., 0.0018 inch). However, the printing of a third thick-film printed and fired electrically insulative layer will result in a total fired thickness of 0.0024 inch, as recommended by the manufacturer in the Celcion IP6075 Technical Data Sheet issued by Heraeus Electronics in 2016. If a third layer of the Celcion IP6075 dielectric paste is printed and fired, then the total thickness for all three printed and fired layers (viz., 0.0024 inch) would exceed the maximum allowable thickness, $t_{dielectric}$ for this example thick-film printed and fired heater circuit assembly (viz., 0.0018 inch) by 33%, thereby resulting in the likelihood of the fracture, cracking and/or breaking of this first electrically insulative layer comprising three separately thick-film printed and fired electrically insulative layers.

Example 3

In this third example, as seen in Equation 1J, the maximum allowed thickness, $t_{dielectric}$ of the thick-film printed and fired first electrically insulative layer is determined by the thermal conductivity, $k_{dielectric}$ of the thick-film printed and fired first electrically insulative layer and the maximum applied heat flux, $\{Q_{heater}/A_{heater}\}$. By way of this third example, the overall dimensions of a first plate of an isothermal cooking plate assembly of a griddle system are 5.0 inches×6.0 inches. The total area of 19 thick-film printed and fired second electrically resistive heating element legs (as seen in FIG. 3) disposed on the thick-film printed and fired first electrically insulative layer that covers substantially the entire back surface of first plate is 24.0 square inches (154.8 sq·cm.). Due to the necessary spacing between second electrically resistive heating element legs, the total area of 19 thick-film printed and fired second electrically resistive heating element legs is less than the total area of the first plate of an isothermal cooking plate assembly of a griddle system Based on a maximum applied power of 2300 watts (corresponding to the application of a nominal line voltage of 115 volts at 20 amps) during the heat up of the specified first plate of an isothermal cooking plate assembly of a griddle system, the maximum applied heat flux, $\{Q_{heater}/A_{heater}\}$ is 2300 watts/154.8 sq·cm. or 14.86 watts/sq·cm.

Continuing with this third example, a second preferred commercially available material for the thick-film printed and fired first electrically insulative layer is the IP6075 dielectric paste manufactured by Heraeus Electronics, Heraeus Deutschland GmbH & Co. KG, Hanau, Germany. This dielectric paste, developed for thick-film printing and firing on aluminum substrates, has a coefficient of thermal expansion, $\alpha_{dielectric}$ that closely matches the coefficient of thermal expansion of aluminum (viz., $21 \times 10^{-6}$ per degree C.). The measured thermal conductivity of the thick-film and fired IP6075 dielectric material is 0.0010 watts/cm-C, as reported in the Celcion IP6075 Technical Data Sheet issued 2016. The above Equation 1I for the maximum allowed thickness, $t_{dielectric}$ of the thick-film printed and fired first electrically insulative layer, as seen above in Equation 1J, can be expressed as follows:

$$t_{dielectric} = \{34.4 * k_{dielectric}\}/\{Q_{heater}/A_{heater}\}$$

$$t_{dielectric} = \{34.4 * 0.0010 \text{ watts}/cm\text{-}C\}/14.86 \text{ watts/sq·cm}.$$

$$t_{dielectric} = 0.0023 \text{ cm} = 0.0009 \text{ inch}$$

Based on the this third example, a thick-film printed and fired first electrically insulative layer having a coefficient of thermal expansion, $\alpha_{dielectric}$ substantially the same as the aluminum first plate and nominal values for glass (viz., breaking strength, $\sigma_{dielectric}$ equal to 10,000 psi, modulus of elasticity, $E_{dielectric}$ equal to $9.2 \times 10^6$ psi and Poisson's ratio, $\mu$ equal to 0.3), a thermal conductivity of 0.0010 watts/cm-C and a maximum heat flux of 14.86 watts/sq·cm., the thickness, $t_{dielectric}$ of the thick-film printed and fired first electrically insulative layer must not exceed 0.0009 inch in order to avoid fracture, cracking and/or breaking of the first electrically insulative layer.

However, to avoid "pin-holes" in the electrically insulative layer (i.e., very small defects due to incomplete coverage of the substrate by the thick-film and fired electrically insulative layer, it is common to thick-film print and fire a first layer of the thick-film printed electrically insulative layer followed by a second and even a third thick-film printed and fired to eliminate the possibility of "pin hole" defects in the overall first electrically insulative layer, thereby eliminating unwanted electrical current flow paths through the first electrically insulative layer.

Since the minimum of thickness of each thick-film printed and fired electrically insulative layer is specified by the thick-film paste manufacturer to be 0.0008 inch (20 microns), then the requirement to thick film print and fire a second layer of the electrically insulative layer will result in a total thickness of the first electrically insulative layer, $t_{dielectric}$ following the second thick film printing and firing of up to 0.0016. This total thickness of the first electrically insulative layer, $t_{dielectric}$ exceeds the maximum allowable thickness, $t_{dielectric}$ for this example thick-film printed and fired heater circuit assembly (viz., 0.0009 inch) by 77% and the likelihood of the fracture, cracking and/or breaking of the first electrically insulative layer.

As seen in Equation 1J and specified above in Examples 1, 2 and 3, the maximum allowed thickness, $t_{dielectric}$ of a thick-film printed and fired first electrically insulative layer is directly proportional to the thermal conductivity, $k_{dielectric}$ of the first electrically insulative layer (following printing and firing) and is inversely proportional to the maximum applied heat flux. The maximum applied heat flux occurs during the rapid heat-up of the first plate of an isothermal cooking plate assembly of a griddle system. As seen in Examples 2 and 3 above, the requirement for thick-film printing and firing of two to three separate layers of the thick-film printed and fired electrically insulative layer can exceed the maximum allowable thickness, $t_{dielectric}$ depending on the thermal conductivity, $k_{dielectric}$ and the maximum applied heat flux, $\{Q_{heater}/A_{heater}\}$ of the thick-film printed and fired first electrically insulative layer.

Referring now to FIG. 1, a two-station griddle system embodiment of the disclosure is represented in general at 10 wherein each griddle is independently controllable. Griddle system 10 includes isothermal cooking plate assemblies 50a, 50b at first and second cooking stations, respectively, comprising first plates 52a, 52b of high thermal conductivity material surmounted on second plates 30a, 30b of low thermal conductivity material, respectively. The front panel 12, left side panel 14, right side panel 16, and rear panel 18 of enclosure for griddle system 10 may be manufactured using 0.036"-thick austenitic stainless steel Type 304 sheet material available from McMaster-Carr Supply Company (Cleveland, Ohio). A thick-film printed and fired heater circuit assembly 130 (see FIG. 3) is in thermal communication with and disposed on the side opposite of the first plate surfaces (not shown in FIG. 1). Alternatively, the griddle system may incorporate three or more independently controllable stations.

Still referring to FIG. 1, controllers 20a, 20b corresponding to the two stations of the griddle system 10 include set-point up/down selector buttons 25a, 25b as well as set-point displays 22a, 22b and actual first plate temperature displays 24a, 24b. By way of example, a controller 20 for controlling temperature of first plate 52 is available from Omega Engineering, Inc. Model No. CNi8DH (Stamford, Connecticut). Controller 20 for controlling temperature of first plate 52 includes solid-state relay to control power applied thick-film printed and fired heater circuit assembly 130 (not shown). By way of example, a preferred solid-state relay with integral heat sink is Crydom Model No. HS251-D2450 available from Wolf Automation, Inc. (Algonquin, Illinois). Temperature feedback control is provided to controller 20 for controlling temperature of first plate 52 by temperature sensor 39 mechanically attached to first plate seen in FIG. 5. By way of example, temperature sensor 39 may be a CHROMEL®-ALUMEL® (registered trademarks of Hoskins Alloys, L.L.C., Farmington Hills, MI) washer-type thermocouple available from Omega Engineering, Inc. (Stamford, Connecticut). Also, as seen in FIG. 1, the front panel of griddle system 10 includes controller on/off controls 26a, 26b and on/off power switch for griddle heaters 27a, 27b.

As seen in FIG. 1, rear support 44 is shown in phantom view along with first stabilization pins 40a, 40b and second stabilization pins 42a, 42b machined from austenitic stainless steel Type 304 rod stock with threaded proximal end for mechanical attachment to rear panel 18 of griddle system 10. Rear support 44 may be an austenitic stainless steel Type 304 90-degree angle available from McMaster-Carr Supply Company (Cleveland, Ohio). First and second isothermal cooking plate assembly 50a mechanical fastening screws 40a, 42a are seen at front end of first plate incorporated in first cooking station of griddle system 10. Also, as seen in FIG. 1, first and second isothermal cooking plate assembly 50b mechanical fastening screws 40b, 42b are seen at front end of first plate incorporated in second cooking station of griddle system 10. All mechanical fastening screws identified throughout this specification are preferably fabricated from austenitic stainless steel Type 316 and available from McMaster-Carr Supply Company (Cleveland, Ohio).

Figure 2:
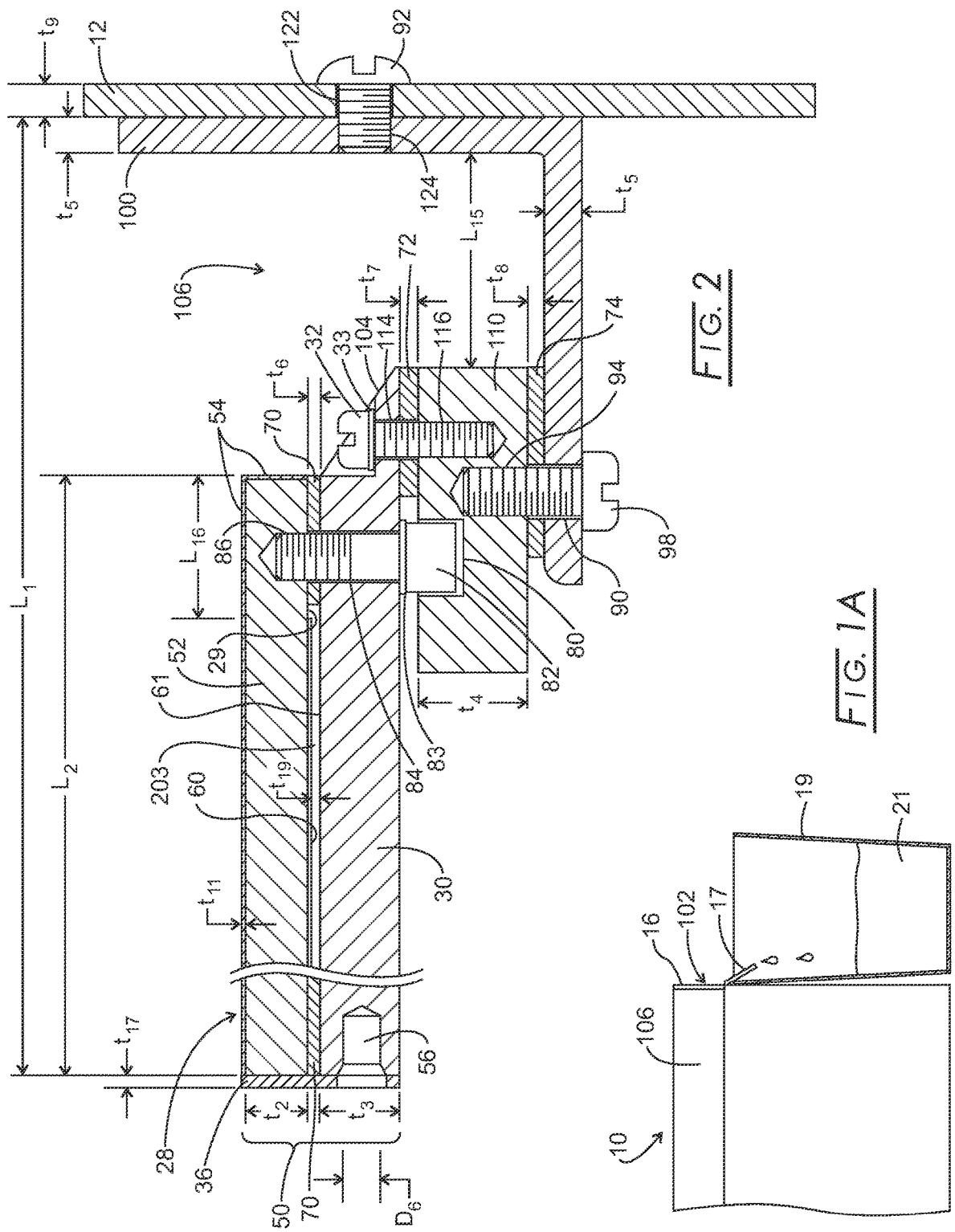
FIG. 2 is a detailed sectional view of the isothermal cooking plate assembly showing first plate of high thermal conductivity material, thick-film heater circuit assembly and second plate of low thermal conductivity material illustrating mechanical attachment between first and second plate, front support and rear support pin receiving holes.

Referring to FIGS. 1 and 2, mechanical fastening screws 92a, 92b of diameter D2 are seen at front panel 12 of griddle system that pass through holes 122 of diameter D10 and into threaded holes 124 mechanically secure front support member 100 to front panel 12. Also, excess liquid and cooking debris discharge opening 102 in the right side panel 16 is shown in FIG. 1 at right end of discharge trough 106 (seen in FIG. 2). A portion of the right side panel 16 is cut and folded down forms ramp 17 that enables the flow of excess oil/fat and cooking debris 21 through excess liquid and cooking debris discharge opening 102 into receptacle 19 as seen in FIG. 1A.

Referring to FIGS. 1 and 2, gap 46 is seen between first-station first plate 52a of high thermal conductivity material and second-station first plate 52b of high thermal conductivity material of high thermal conductivity material is filled with strip of resilient, closed-cell silicone foam in the form of a liquid-tight sealing strip 36a, 36b. Still referring to FIGS. 1 and 2, a strip of resilient, closed-cell silicone foam in the form of a liquid-tight sealing strip 36a, 36b continues around the perimeter of first plate 52a, 52b of high thermal conductivity materials and adjacent second plates 30a, 30b of low thermal conductivity materials to form a liquid-tight seal at the interface between the isothermal cooking plate assembly 50 and the left side panel 14, right side panel 16 and rear panel 18. By way of example, all silicone sealing strips and gaskets referenced throughout this specification may be procured from Stockwell Elastomerics Corporation (Philadelphia, Pennsylvania). Gap 46 provides for the thermal isolation of first-station first plate 52a of high thermal conductivity material and second-station first plate, 52b of high thermal conductivity material so that the first- and second-station first plates can be optionally operated at different set-point temperatures.

Referring now to FIG. 2, the mechanical attachments between the first plate 52 of high thermal conductivity material, second plate 30 of low thermal conductivity material, thermally insulative mounting support 110 and front support member 100 are shown in greater detail.

First plate 52 of high thermal conductivity material may be machined from Type 1100 aluminum plate or Type 6061 aluminum plate, both available from McMaster-Carr Supply Company (Cleveland, Ohio). Second plate 30 of low thermal conductivity material may be injection molded from a plastic material with a high service temperature of at least 150 C. By way of example, second plate 30 of low thermal conductivity material may be injection molded from [a] RYTON® polyphenylene sulfide resin available from Chevron-Phillips Chemical Company (Woodlands, Texas) or [b] ULTEM® 1000 polyetherimide resin available from Sabic Corporation (Pittsfield, Massachusetts). By way of example, thermally insulative mounting support member 110 may be machined from DELRIN© (registered trademark of E.I. du Pont de Nemours and Company, Wilmington, Delaware) acetal resin bar stock available from McMaster-Carr Supply Company (Cleveland, Ohio).

The uniformly thick first plate 52 of high thermal conductivity material may optionally be roll bonded on the top cooking surface 28 with a cladding layer (not shown in figures), for instance, formed of austenitic stainless steel, such as a Type 304. The preferred thickness of the cladding layer is in the range 0.002 to 0.010 inch, more preferably 0.002 inch to 0.004 inch. A small cladding thickness is preferred to minimize the effect of the added volume of cladding material on the time to heat up the first plate 52 of isothermal cooking plate assembly 50 from room temperature to the operator-selected set-point temperature.

In a preferred embodiment seen in FIG. 2, the exposed top cooking surface 28 and front edge surface of first plate 52 of high thermal conductivity material are covered with a non-stick coating 54. By way of example, non-stick coating may be selected from polytetrafluoroethylene (PTFE) type coatings such as XYLAN© 8110 supplied by Whitford Corporation (Elverson, Pennsylvania). Such non-stick coatings may be deposited in the form of a powder or liquid using a spray application method having a continuous thickness of about 0.0005 to 0.005 inch. The non-stick coating and the first plate are then heated to an elevated temperature (e.g., 200 C to 350 C) to provide an adherent bond between the non-stick coating and the cooking surface 28 of the first plate 52. Alternatively, ceramic, PTFE-free non-stick coatings are available from Thermalon Korea Company, Ltd. In the U.S., THERMALON® (registered trademark of FIPA GmbH Gellschaft mit beschränkter Haftung Fed Rep Germany, Ismanoing, Germany) coating Sol Gel 101 is available from Porcelain Industries (Dickson, Tennessee).

First plate 52, thick-film printed and fired heater circuit assembly 130 and second plate 30 combine to form cooking plate assembly 50 that is mechanically attached to the griddle system and replaceable in the field by mechanically disconnecting the first and second electrical leads 158 and 160 from first and second contact pads 62 and 64, respectively, and by mechanically disconnecting temperature sensor 39 from the first plate and mechanically disconnecting cooking plate assembly from the griddle system. The arrangement of mechanical fastening attachments seen in FIG. 2 provides for the convenient removal of isothermal cooking plate assembly 50 in the field where the griddle system 10 is being used in the event of [a] degradation of the non-stick coating 54, [b] electrical failure of the thick-film printed and fired heater circuit assembly 130 and/or [c] electrical failure of temperature sensor 39 (seen in FIG. 5).

As seen in FIG. 2, first plate 52 of high thermal conductivity material is mechanically attached to second plate 30 of low thermal conductivity material with mechanical fastening screw 82 of diameter D3 that passes through hole 84 of diameter D11 in second plate 30 of low thermal conductivity material and into threaded hole 86 in first plate 52 of high thermal conductivity material at a minimum of four locations, preferably at a minimum of at least six locations. The diameter of hole 84 in second plate 30 of low thermal conductivity material is enlarged to accommodate the thermal expansion difference between first plate 52 of high thermal conductivity material operating at elevated set-point temperature selected for cooking purposes and lower temperature of second plate 30 of low thermal conductivity material. Also, as seen in FIG. 2, low-friction washer (e.g., polytetrafluorethylene) 83 is positioned between head of mechanical fastening screw 82 and surface of second plate 30 of low thermal conductivity material to enable sliding of mechanical fastening screw 82 relative to second plate 30 of low thermal conductivity material as a result of differential thermal expansion induced forces. By way of example, low-friction polytetrafluoroethylene washers are available from Boker's, Inc. (Minneapolis, Minnesota).

Still referring to FIG. 2, a high-temperature gasket 70 (e.g., silicone rubber) is positioned around the perimeter of the interface between the first plate 52 of high thermal conductivity material and the second plate 30 of low thermal conductivity material. A counter bore hole 80 is machined in thermally insulative mounting support member 110 to accommodate head of mechanical fastening screw 82 whose location is offset (to prevent mechanical interference) from the location of mechanical fastening screw 98 of diameter D5. Thermally insulative mounting support member 110 is securely attached to front support member 100 with mechanical fastening screw 98 that extends through hole 90 of diameter D13 in front support member 100 and into threaded hole 94 in thermally insulative mounting support member 110.

Figure 5:
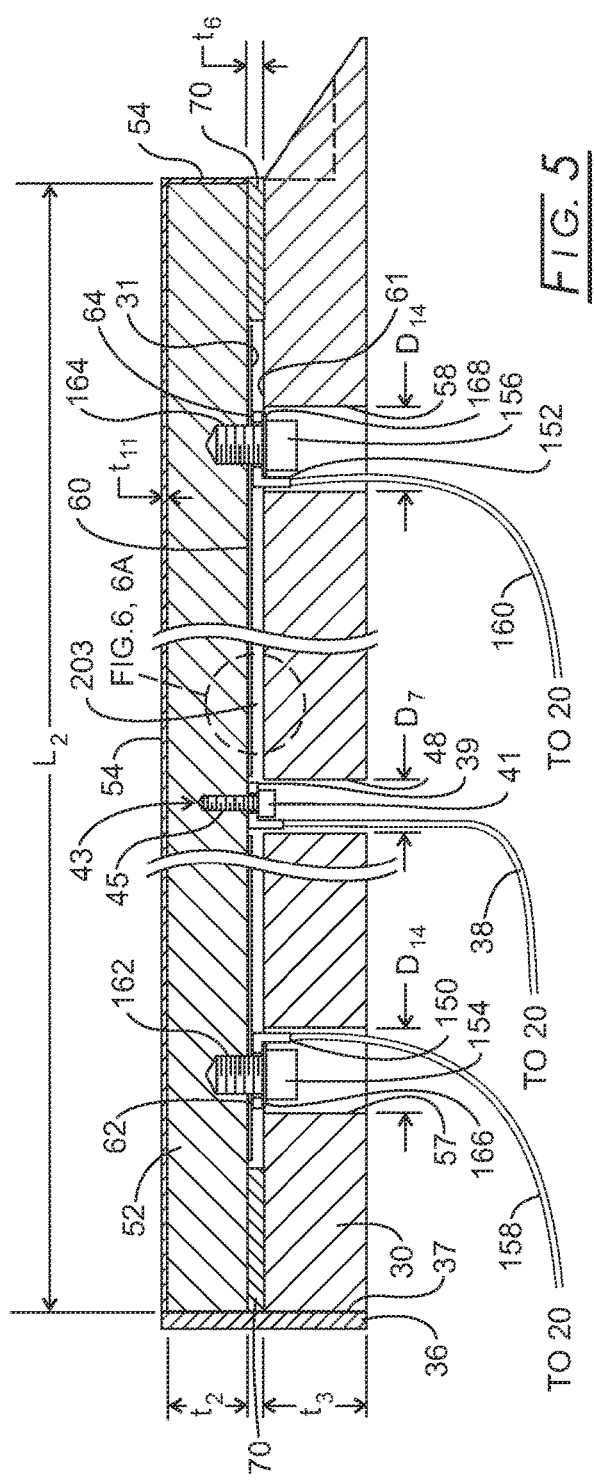
FIG. 5 is a detailed sectional view of portions of isothermal cooking plate assembly showing mechanical attachment and location of washer-type temperature sensor as well as mechanical attachment and location of first and second washer-type electrical contacts at the distal ends of first and second leads extending from controller.

As seen in FIG. 5, through hole 57 in the second plate 30 of low thermal conductivity material provides for the passage of first electrical contact tab 150 at distal end of first lead 158 (originating at controller 20b) for mechanical attachment to first plate 52 at location of and in electrical communication with first electrical contact pad 62. Likewise, an opening (e.g., machined hole) 58 in the second plate 30 of low thermal conductivity material provides for the passage of second electrical contact tab 152 at distal end of second lead 160 (originating at controller 20b) for mechanical attachment to first plate 52 at location of and in electrical communication with second electrical contact pad 64.

Returning to FIG. 2, mechanical fastening screw 98 secures thermally insulative mounting support 110 to front support member 100. As seen in FIG. 2, liquid-tight barrier strip 74 is located between the base of thermally insulative mounting support 110 and the top surface of front support member 100 to prevent the ingress of liquids into the interior of the griddle system 10. By way of example, liquid-tight barrier strip 74 may be formed from silicone sheet material available from Stockwell Elastomerics Corporation (Philadelphia, Pennsylvania).

Still referring to FIG. 2, receiving hole 56 of diameter D6 is seen at back end of second plate 30 of low thermal conductivity material for engagement with stabilization pin 40 or 42. The combination of the insertion of these stabilization pins 40, 42 into receiving holes 56 at the rear of second plate 30 of low thermal conductivity material and the engagement of mechanical fastening screw 32 of diameter D4 at the front end of second plate 30 of low thermal conductivity material provide for the removable attachment of the isothermal cooking plate assembly to the griddle system 10. A seen in FIG. 2, mechanical fastening screw 32 passes through hole 114 of diameter D12 in second plate 30 of low thermal conductivity material and into threaded hole 116 in thermally insulative mounting support 110. The diameter of hole 114 in second plate 30 of low thermal conductivity material is enlarged to accommodate the thermal expansion difference between second plate 30 of low thermal conductivity material operating at an elevated temperature and the lower temperature of thermally insulative mounting support 110. Also, as seen in FIG. 2, low-friction washer (e.g., polytetrafluorethylene) 33 is positioned between head of mechanical fastening screw 32 and surface of thermally insulative mounting support 110 to enable sliding of mechanical fastening screw 32 relative to thermally insulative mounting support 110 as a result of differential thermal expansion induced forces. By way of example, low-friction polytetrafluoroethylene washers are available from Boker's, Inc. (Minneapolis, Minnesota).

As seen in FIG. 2, liquid-tight barrier strip 72 is located between the base of second plate 30 of low thermal conductivity material and the top surface of thermally insulative mounting support 110 to prevent the ingress of liquids into the interior of the griddle system 10. Also, liquid tight sealing strip 36 is seen at back edge of isothermal cooking plate assembly 50 to prevent ingress of liquids into interior of griddle system. By way or example, liquid-tight barrier strips 36 and 72 may be formed from silicone sheet material available from Stockwell Elastomerics Corporation (Philadelphia, Pennsylvania).

Figure 4:
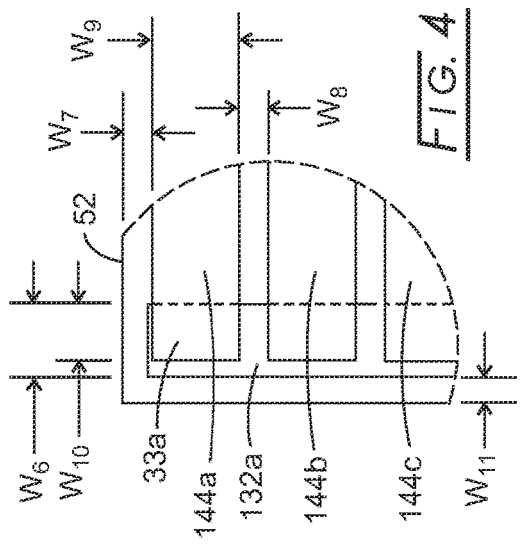
FIG. 4 is an enlarged top view section of portion of resistive heating elements and electrically conductive bus strip.

Referring now to FIGS. 3 and 4, a top view of thick-film printed and fired heater circuit assembly 130 is seen having 18 electrically resistive heating element legs 144a-144r and one electrically resistive heating element leg 145 whose line widths W9 and line spacings W8 are selected to provide substantially equal resistance within each heating element leg. The substantially equal resistance among all electrically resistive heating element legs 144a-144r and 145 as well as the uniformity of line widths W9 and line spacings W8 enables heating power to be substantially uniform over the entire surface area of the thick-film printed and fired heater circuit assembly 130. Electrically conductive bus strips 132a, 132b are seen at either end of the electrically resistive heating element legs 144a-144r and 145. The thick-film printed and fired heater circuit assembly 130, as seen in FIG. 3, may be dimensioned so that it substantially covers and is in thermal communication with the entire surface area of the back surface, 159 (i.e., side opposite the food-cooking surface side) of first plate 52a of high thermal conductivity material and first plate 52b of high thermal conductivity material as seen in FIG. 1.

By way of example and referring to FIGS. 1, 2 and 5, the width, W3 dimension of first plate 52 may be 6.0 inches and the length, L2 dimension may be 9.0 inches. The width, W4 of thick-film printed and fired heater circuit assembly 130 may be 5.8 inches and the length, L3 of thick-film printed and fired heater circuit assembly 130 may be may be 8.8 inches as seen in FIGS. 1 and 3. The thick-film printed and fired heater circuit assembly 130 is surmounted on the back side surface 29 of first plate 52 of high thermal conductivity material as seen in FIG. 2. Electrical leads 158 and 160 from controller 20 are connected to first electrical contact pad 62 and second electrical contact pad 64, respectively, of thick-film printed and fired heater circuit assembly 130. Temperature sensor 39 is in thermal communication with first plate 52 of high thermal conductivity material at a geometrical center position 47 of first plate 52 through opening 49 in thick-film printed and fired heater circuit assembly 130 as seen in FIG. 3. Term "geometrical center position" as used herein refers to a position that is equidistant from all four sides comprising the perimeter of first plate 52. By way of example, in the present example where the width W3 and length L2 of first plate 52 are 6.0 inches and 9.0 inches, respectively, the geometrical center position of first plate 52 would be 4.5 inches from the 6.0-inch wide side and 3.0 inches from the 9.0-inch long side. In the case of the present example, temperature sensor 39 may be placed in thermal communication with the first plate 52 of high thermal conductivity material by mechanically attaching a washer-type thermocouple using a No. 6 machine screw 41 secured into a "blind" machined hole 45 in the bottom surface of first plate 52, the machined hole having a diameter of nominally 0.138 inch corresponding to the machined hole required for a No. 6-32 machine screw. By way of example, washer-type thermocouples are available from Omega Engineering, Inc., Norwalk, Connecticut and are designated Model No. WT(K)-6-12.

Referring now to FIGS. 2, 3, 4, 5 and 6, as a first step, one or more first electrically insulative layers having total thickness, t12 are thick-film printed and fired on substantially the entire back side surface 29 of first plate 52 except at the locations of drilled and tapped holes 47, 62, 64 and 85a-85d and having a set-back distance of L16 from the perimeter of first plate 52 as seen in FIGS. 2 and 3. Preferably, total thickness, t12 after firing is in the range from about 0.0002 to 0.0040 inch. Next, electrically conductive bus strips 132a and 132b of width, W6 are thick-film printed and fired on the first electrically insulative layer 141 at either end of back side surface 29 of first plate 52 as seen in FIGS. 3 and 4. Next, electrically resistive heating element legs 144a-144r and 145 of width W9 are thick-film printed and fired with the ends of each electrically resistive heating element leg thick-film printed on the surface of the electrically conductive bus strips 132a and 132b with an overlap width, W10 as seen in FIGS. 3 and 4, thereby providing low-resistance electrical communication paths between the electrically conductive bus strips 132a and 132b and the electrically resistive heating element legs 144a-144r and 145. Next, electrically insulative cover layer 142 is thick-film printed and fired over all exposed surfaces of the electrically conductive bus strips 132a and 132b except at locations of contact pads 62 and 64 as well as electrically resistive heating element legs 144a-144r and 145.

As seen in FIG. 3, third electrically conductive bus strip 132a terminates in first electrical contact pad 62 and third electrically conductive bus strip 132b terminates in second electrical contact pad 64. The surfaces of the electrically conductive bus strips 132a, 132b as well as the first electrical contact pad 62 and second electrical contact pad 64 are electrically conductive. The electrically conductive surfaces of the electrically conductive bus strips 132a, 132b enables the formation of low-resistance electrical contacts between the electrically conductive bus strips 132a, 132b and the thick-film printed electrically resistive heating element legs 144a-144r and 145 in the region of overlap having length, W6 as seen in FIGS. 3 and 4. Also, the electrically conductive surfaces of the electrically conductive first electrical contact pad 62 enables the formation of a low-resistance electrical contact between the first electrical contact pad 62 and first washer-type electrical contact 150 as seen in FIG. 5. Likewise, the electrically conductive surfaces of the electrically conductive second electrical contact pad 64 enables the formation of a low-resistance electrical contact between the second electrical contact pad 64 and second washer-type electrical contact 152 as seen in FIG. 5.

As seen in FIG. 5, first washer-type electrical contact 150 is removably attached to and maintained in good electrical communication with first electrical contact pad 62 by first socket head screw 154 in combination with first Belleville spring washer 166 positioned between first socket head screw 154 and first washer-type electrical contact 150. Likewise, second washer-type electrical contact 152 is removably attached to and maintained in good electrical communication with second electrical contact pad 64 by second socket head screw 156 in combination with second Belleville spring washer 168 positioned between second socket head screw 156 and second washer-type electrical contact 152.

Returning to FIGS. 3 and 4, the preferred material for second resistive heating element legs 144a-144r and 145 is a resistive material having a low temperature coefficient of resistance, preferably less than 700 parts per million per degree C., more preferably less than 200 parts per million per degree C. A low temperature coefficient of resistance of the electrically resistive heating element legs 144a-144r and 145 allows maximum heating power to be delivered to thick-film printed and fired heater circuit assembly 130 with widely available line voltages (viz., 115 volts in the United States) even as the temperature of resistive heating element legs 144a-144r and 145 increases from room temperature to the maximum operator-selectable set-point temperature for the first plate 52 of the isothermal cooking plate assembly 50 (viz., 230 C or 450 F).

Referring now to FIG. 3, through holes 66 and 68 of diameter D8 are seen in first electrical contact pad 62 and second electrical contact pad 64, respectively. These through holes 66, 68 enable attachment of mechanical fastening screws 154 and 156, respectively as seen in FIG. 5.

Figure 6:
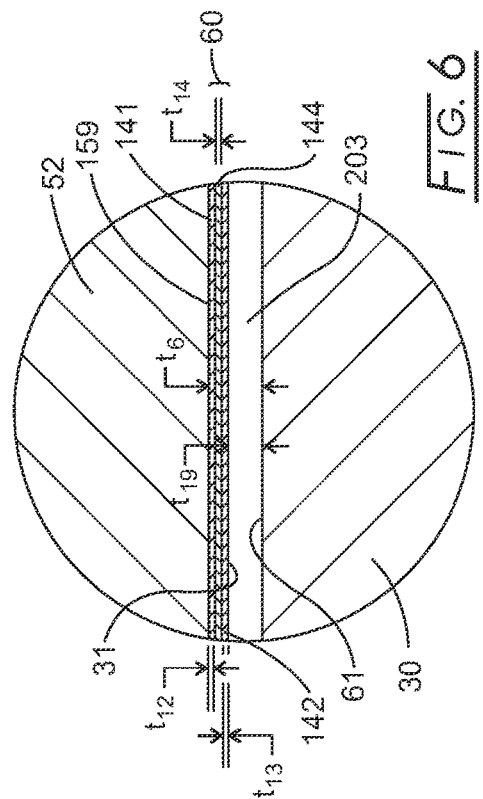
FIG. 6 is an enlarged partial view of first plate of high thermal conductivity material, thick-film printed and fired heater circuit assembly and second plate of low thermal conductivity material.

Referring to FIGS. 5 and 6, thermally conductive first plate 52 is seen having a continuous and uniform thickness, t2 over the cooking surface 28 having length, L2 and width, W3. Exterior surface 31 of printed and fired heater circuit assembly 130 disposed on back side surface 29 of thermally conductive first plate 52 is separated from front side 61 of thermally insulative second plate 30 by air gap 203 having thickness, t19. Also, in the preferred embodiment seen in FIG. 5, the entire top cooking surface 28 that can come in contact with food being cooked as well as the front edge surface of first plate of high thermal conductivity material are covered with a non-stick coating 54 having thickness, t11.

Isothermal Cooking Plate Heat Transfer Analyses

The preferred design of the first plate 52 of the isothermal cooking plate assembly 50 of the present disclosure is capable of rapid heat-up from 25 C (i.e., room temperature) to a cooking temperature of 150 C within less than about 30 seconds using up to 20 amps at 115 to 120 volts (i.e., widely available line power) while maintaining the cooking surface 28 of first plate 52 within 10 degrees C. of the set-point temperature (e.g., 150 C) throughout the entire zone of food 53 being cooked at loading factors up to 60% (as defined below). The attainment of a rapid heat-up, isothermal cooking plate assembly 50 for a full range of cooking conditions using widely available 115-volt line power required the optimization of the first plate 52 surface area, length-to-width aspect ratio of first plate 52, thickness, t2 of first plate 52 and material of construction of first plate 52. The optimization of the design of the isothermal cooking plate assembly 50 of the present disclosure was achieved by performing heat transfer analyses for a full range of first plate 52 lengths, widths, thicknesses, materials of construction and loading factors. The term "loading factors" refers to the amount of food 53 simultaneously being cooked and the distribution of portions of food 53a, 53b, on the cooking surface 28 of first plate 52. The unit of measure of loading factor is a percentage and refers to the fraction of the total cooking surface 28 of first plate 52 covered by one or more portions of food 53. For example, if the combined area of the articles of food 53 being cooked is 20 in$^2$ and the cooking surface 28 area of first plate is 50 in$^2$, then the loading factor is 20/50 in$^2$ or 40%.

The thermal model used in these heat transfer analyses accurately represents actual known cooking conditions for commercially available griddles. In this regard, the cooking industry has developed uniform testing procedures to evaluate the performance and efficiency of commercially available cooking appliances (see Kaufman, D., et. al., "Development of Uniform Testing Procedures for Commercial Cooking Appliances-Griddles", Archives of American Council for Energy Efficient Economy, 1988 Archives, ACEEE 1988 Proceedings, Volume 4-008, pages 4.70-4.81).

Figure 9:
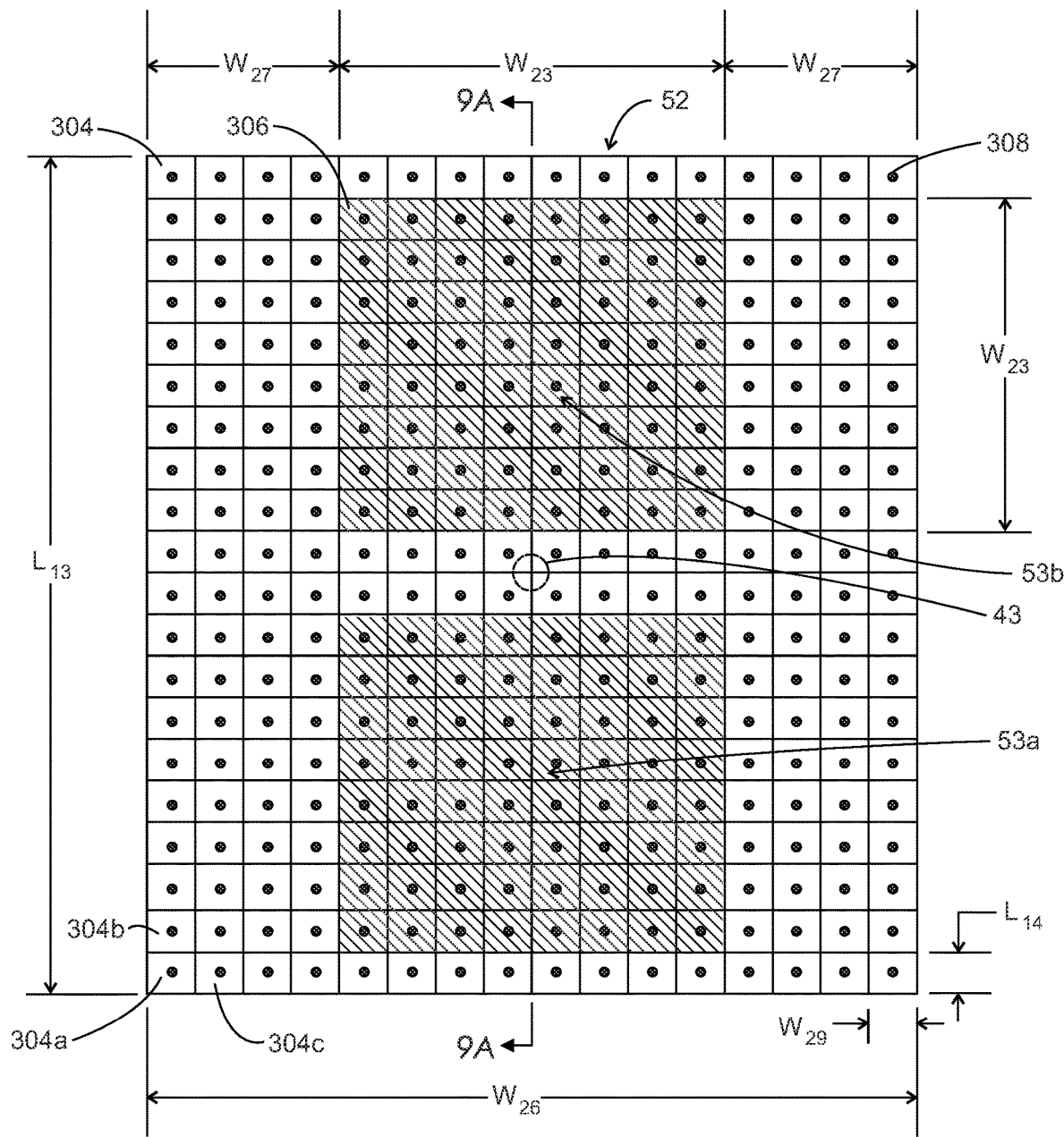
FIG. 9 is a detailed top view of a thermal model used to perform heat transfer analyses of alternative first plate designs.

The test procedure described in the above referenced report includes the specification of the standard food portion used to evaluate the performance and efficiency of griddles. The standard food portion is one or more one-quarter pound hamburger patties containing 20% fat (by weight) and moisture content of 60% to 65%. The amount of energy transferred to the hamburger food portion in the above referenced study was determined to be 475 BTU/pound of hamburger. In the cited standard testing procedure, the adequate cooking of the standard hamburger patty was achieved in 7.83 minutes or 0.1305 hours. The above standardized energy requirement of 475 BTU/pound of hamburger delivered in 0.1305 hours results in a heating power input of 3,640 BTU/hour per pound of hamburger, which is equivalent to 1,067 watts per pound of hamburger or 267 watts per one-quarter pound hamburger. The thermal model assumed each food portion was a one-quarter pound hamburger and the average heat input, $Q_{food}$ during the period of cooking each one-quarter pound hamburger was 267 watts. The heat input per unit area or heat flux into the portion of food 53 was determined by dividing 267 watts by the area of the portion of food 53 (e.g., hamburger patty). The example thermal model seen in FIG. 9 includes two shaded regions that represent two food portions 53a and 53b (viz., two hamburger patties). Each food portion 53a and 53b is comprised of 64 food portion subregions 306. Hence, the heat flux into an individual food portion 53a or 53b is 267 watts divided by the area of 64 food portion subregions 206. Since the length, L14 is 0.394 inch (1.00 cm) and width, W29 is 0.394 inch (1.00 cm) for all food portion subregions 306 (as well as all first plate subregions 304), the total area of each food portion 53a and 53b seen in FIG. 9 is 64 cm$^2$. The heat flux into each food portion subregion 306 is 267 watts divided by 64 cm$^2$ or 4.17 watts/cm$^2$.

Those portions of the cooking surface 28 of the first plate 52 not covered by one or more portions of food 53 were assumed to dissipate heat 332 to the environment by free convection heat transfer and radiation heat transfer based on a surface emittance of 0.9 corresponding to the actual radiation emittance of typical non-stick coatings. The free convection heat transfer, $Q_{conv}$ from each of the exposed cooking surfaces of each first plate subregion 304 of first plate 52 that are not covered by one or more portions of food 53. The free convection heat transfer, $Q_{conv}$ is based on the well-known convection heat transfer equation:

$$Q_{conv} = h^* A_{subregion}^* (T_{subregion} - T_0) \qquad \text{(Equation 1I)}$$

In the above Equation 1I, the free-convection heat transfer coefficient, h for a horizontal plate facing upward is 9.5×10$^4$ watts/(cm$^2$-C). The term $A_{subregion}$ in the above equation refers to the exposed surface area (in units of square centimeters) of each of the first plate subregions 304 not covered by a food portion subregion 306 of food portion 53. The term $T_{subregion}$ refers to the temperature of each first plate subregion 304 and the term $T_0$ refers to the ambient or room temperature, both in same units of either degrees Celsius (C) or degrees Kelvin (K).

The radiation heat transfer, $Q_{rad}$ from each of the exposed cooking surfaces of each first plate subregion 304 the of the first plate 52 that are not covered by one or more portions of food 53 is based on the well-known radiation heat transfer equation:

$$Q_{rad} = \sigma * \varepsilon * A_{subregion} * (T'^4_{subregion} - T'^4_0) \quad \text{(Equation 2)}$$

In the above Equation 2, σ refers to the Stefan-Boltzmann constant that has the value $5.67 \times 10^{-12}$ watts/cm²-K⁴. The term ε refers to the radiation emittance of the exposed surface of each of the first plate subregions 304 not covered by a food portion subregion 306 of food portion 53. For the assumed covering of the cooking surface 28 of first plate 52 with a non-stick coating, the corresponding unitless radiation emittance of such coatings is nominally 0.9. The term $A_{subregion}$ in the above equation refers to the exposed surface area (in units of square centimeters) of each of the first plate subregions 304 not covered by a food portion subregion 306 of food portion 53. The term $T'_{subregion}$ refers to the temperature of each first plate subregion 304 and the term $T'_0$ refers to the ambient or room temperature, both in the same units of degrees Kelvin (K) since the Stefan-Boltzmann constant is in reciprocal units of degrees Kelvin raised to the fourth power. The absolute Kelvin temperature scale is defined as the temperature in degrees Centigrade plus 273. By way of example, a temperature of 150 Centigrade corresponds to a temperature of 150 C+273 or 423 Kelvin.

Figure 9A:
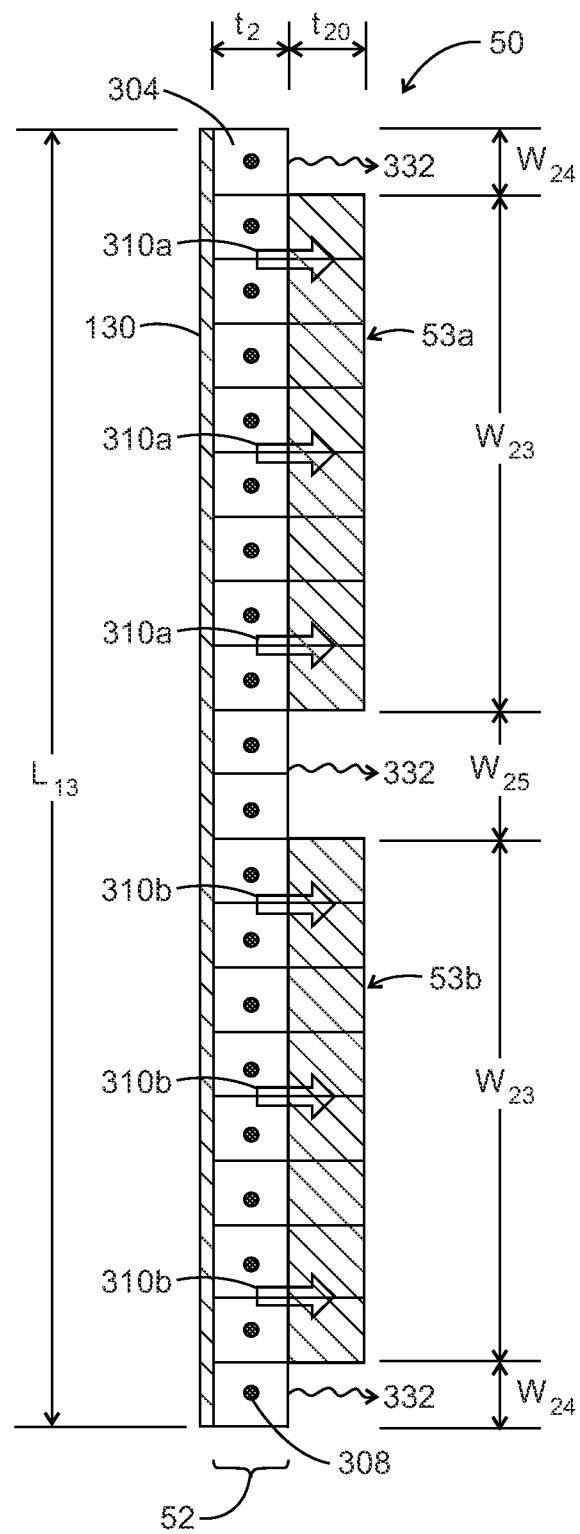
FIG. 9A is a detailed cross-sectional view of a thermal model used to perform heat transfer analyses of alternative first plate designs.

The thermal model used for the heat transfer analysis of alternative designs for a first plate 52 is based on distributed uniform heating by a heater circuit assembly 130 surmounted on essentially the entire back surface area 159 of first plate 52 as seen in FIGS. 1B, 5 and 9A. Each alternative design for first plate 52 was divided into 320 first plate subregions 304 as seen in FIGS. 9 and 9A. Each first plate subregion 304 is defined by a length, L14, width, W29 and thickness, t2 as seen in FIGS. 9 and 9A. In the thermal models seen in FIGS. 9 through 12, the length, L14 of each first plate subregion 304 is 0.394 inch (1.00 centimeter) and the width, W29, of each first plate subregion 304 is 0.394 inch (1.00 centimeter). The values of the uniform thickness, t2 of each of the 320 first plate subregions 304 in the thermal models seen in FIGS. 9 through 12 ranged from a thickness of 0.120 inch (0.305 centimeter) to 0.375 inch (0.953 centimeter).

At the geometrical center of each first plate subregion 304 is a temperature node 308 corresponding to the computed temperature for each the first plate subregion 304. Each heat transfer analysis case produced a total of 320 temperatures at each temperature node 308 corresponding to each of the 320 first plate subregions 304.

The heat input per unit area of the portion of food 53 discussed above (viz., 267 watts per one-quarter pound hamburger divided by the area of the portion of food 53) was converted into the heat input for each food portion subregion 306 supplied by each corresponding adjacent first plate subregion 304 in direct contact with the adjacent food portion subregion 306 as seen in FIGS. 9 and 9A and indicated by heat conduction arrows 310a and 310b into food portions 53a and 53b, respectively, as seen in FIG. 9A.

The total heat input, $Q_{total}$ that is required to be generated within the heater circuit assembly 130 surmounted on each first plate 52 of the isothermal cooking plate assembly 50 is initially estimated by combining the total heat required for cooking one or more food portions 53, $Q_{food}$ with the estimated free convection heat dissipation, $Q_{conv}$ and estimated radiation heat dissipation, $Q_{rad}$ from the exposed surfaces of first plate 52 not covered by one or more food portions 53. An energy balance equation is solved by iterative heat transfer analyses using an incrementally adjusted value for the total heat input, $Q_{total}$ until the first plate subregion 304 at the corresponding thermocouple location 43 is at the specified set-point temperature (e.g., 150.0 C) as seen in FIG. 9. The performance of iterative heat transfer analyses is necessary since the free convection and radiation heat dissipation values, $Q_{conv}$ and $Q_{rad}$ are initially estimated based on assumed temperatures at temperature nodes 308 (e.g., assumed to be at the set-point temperature of 150 C) for all exposed first plate subregions 304 not covered by food portion subregions 306. The computer-based heat transfer analysis generates steady state temperatures corresponding to the temperature nodes 308 at each of the 320 first plate subregions 304. However, since the computed temperatures for the exposed first plate subregions 304 not covered by food portion subregions 306 will be different from the initially assumed set-point temperature (corresponding to the heated first plate 52 without any heat dissipation into one or more portions of food 53 in contact with first plate 52), then the actual computed free convection and radiation heat dissipation losses will be different that the initially assumed losses corresponding to the entire first plate 52 being at an assumed temperature equal to the selected set-point temperature (e.g., 150 C). The total heat input, $Q_{total}$ is incrementally adjusted until the temperature of the temperature node 308 that corresponds to thermocouple location 43 is equal to the selected set-point temperature (e.g., 150.0 C).

The heat transfer analyses were performed using a thermal analysis computer program developed and validated by the Lawrence Livermore Laboratory and known as the TRUMP computer program (see Edwards, Arthur L., "TRUMP: A Computer Program for Transient and Steady-State Temperature Distribution in Multidimensional Systems", UCRL-14754, Rev. 3, Lawrence Livermore Laboratories, 1972), the disclosure of which is expressly incorporated herein by reference. There are at least a dozen other heat transfer computer programs that could alternatively be used for the thermal analyses performed for the present disclosure including [1] ANSYS Computer Program available from ANSYS, Inc., Canonsburg, Pennsylvania and [2] NASTRAN Computer Program available from MSC Software, Newport Beach, California. The TRUMP thermal analysis computer program, like other similar thermal analysis computer programs, solves general nonlinear parabolic partial differential equations describing flow in various kinds of potential fields such as temperature fields.

The steady state heat transfer analysis performed by the TRUMP computer program involves a first plate 52 comprising a continuous sheet of high thermal conductivity material having a uniform thickness, t2. The flow of a quantity of heat, q, within the first plate 52 is via conduction heat transfer governed by the well-known conduction heat transfer provided below:

$$q = k_{aluminum} * (A_{cond}/L_{cond}) * (T_2 - T_1) \quad \text{(Equation 3)}$$

The heat flow, q in Equation 1 is in units of watts. The term $k_{aluminum}$ in Equation 1 refers to the thermal conductivity of the material comprising first plate 52 and is expressed in units of watts/cm-C. The term $A_{cond}$ in Equation 3 represents the cross-sectional area through which heat flows from a first region to a second region. In the thermal model illustrated in FIGS. 9 and 9A, heat conduction occurs between all adjacent first plate subregions 304. By way of example and referring to FIG. 9, heat conduction occurs between first plate subregion 304a and first plate subregion 304b as well as between first plate subregion 304a and first plate subregion 304c. Likewise, heat conduction occurs between all adjacent first plate subregions 304 of first plate 52 among the 320 first plate subregions 304. As seen in FIG. 9, each of the 320 first plate subregions 304 has a length, L14 and width, W29 whose values are both 0.394 inch (1.00 cm). Since the term $A_{cond}$ represents the cross-sectional area between all adjacent first plate subregions 304, then $A_{cond}$ is equal to the product of [a] the length or width of the first plate subregion 304 and [b] the thickness, t2 of first plate subregion 304. By way of example, for the case of a first plate 52 having a uniform and continuous thickness, t2 of 0.250 inch (0.635 cm), the $A_{cond}$ parameter is equal to the product 0.635 cm×1.00 cm or 0.635 cm². The terms T1 and T2 in Equation 3 refer to the computed temperatures at the geometric center or temperature node 308 associated with each adjacent first plate subregion 304. The term Lcond in Equation 3 refers to the distance between the geometric centers of a first plate subregion 304a and first plate subregion 304b. The geometric centers of each first plate subregion 304 are, by definition, coincident with each of the first plate temperature nodes 308. Since the length, L14 and width, W29 of each first plate subregion 304 are both 0.394 inch (1.00 cm), then the distance between the geometric centers of each first plate subregion 304 is likewise 0.394 inch (1.00 cm)

By way of example and referring to FIG. 9, the amount of heat conduction, q between first plate subregion 304a and first plate subregion 304b can be expressed using Equation 3 as follows:

$$q(304a,304b) = k_{aluminum} * ((W29*t2)/L14) * (T_{304b} - T_{304a})$$ (Equation 4)

For the case of an Aluminum 1100 first plate 52 having a thermal conductivity of 2.18 watts/cm-C, a thickness t2 of first plate 52 of 0.635 cm, a length L14 of 1.00 cm and width W29 of 1.00 cm, Equation 4 can be expressed as follows:

$$q(304a,304b) = 2.18*0.635*(T_{304b} - T_{304a})$$ (Equation 5)

As seen in Equation 4, the larger the value of the thermal conductivity, $k_{aluminum}$ of first plate 52 and the larger the value of thickness, t2 of first plate 52, the larger the amount of heat that can be conducted between adjacent first plate subregions 304 for a given temperature difference or gradient ($T_{304b} - T_{304a}$). Therefore, since one of the objectives of the present disclosure for an isothermal cooking plate assembly 50 is to enable the largest amount of heat to be conducted under conditions of small temperature differences between the set-point temperature and temperatures within the region of the portion of food 53 being cooked, the thermal conductivity of the first plate 52 should be large and the thickness, t2 of the first plate 52 should be large.

The term "isothermal" as used herein refers to the achievement of temperatures within the region(s) of the portion(s) of food 53 being cooked that are substantially the same or within not greater than 10 C of the set-point temperature of the isothermal cooking plate assembly 50. For set-point temperatures up to 230 C (450 F), the criterion for achieving an isothermal cooking plate assembly 50 is the requirement that the temperatures within the region(s) of the portion(s) of food 53 being cooked are within about 10 C of the set-point temperature.

However, it is also one of the objectives of the present disclosure to provide an isothermal cooking plate assembly 50 that can be heated from room temperature to a user selected set-point temperature (e.g., 150 C) within a brief period of less than 30 seconds to maximize the energy and operator time efficiency associated with cooking food. The capability to heat first plate 52 of an isothermal cooking plate assembly 50 from room temperature to 150 C within 30 seconds or less enables the consumption of electrical power and expenditure for associated electricity costs only when a requirement for cooking food occurs (e.g., a customer orders one or more cooked hamburgers or other cooked food items).

The time required for the heat-up of an isothermal cooking plate assembly 50 from room temperature to a user selected set-point temperature for the first plate 52 of the isothermal cooking plate assembly 50 is determined by the well known equation for heat capacitance of a known volume of material having defined values of density and specific heat. By way of example, the time required to heat a first plate 52 plate from 25 C to 150 C having known dimensions and constructed using a known material is based on the well known definition of the specific heat, C of any material. The specific heat of any material is the amount of heat, Q required to raise the temperature, T of the mass, m of one gram of material by one degree Celsius. Based on the definition of the specific heat of a material, the rate of heat up, $\Delta T/\Delta t$ at which the temperature, T of a material will increase per unit time, t is given by the well-known equation:

$$\Delta Q/\Delta t = m*C*\Delta T/\Delta t$$ (Equation 6)

The mass, m, of the first plate 52 of an isothermal cooking plate assembly 50 (in grams) is the product of the volume of the cooking plate, V and the density, ρ of the material comprising the first plate 52 (e.g., Aluminum 1100). Hence, Equation 6 can be expressed in terms of the density, ρ of the material comprising first plate 52 (in units of grams/cm³) and the volume, V of first plate 52 (in units of cm³). Referring to FIG. 9, the volume, V of any first plate 52 having a square or rectangular surface geometry is equal to the product of the length L13, the width W26 and the thickness t2. The specific heat, C, of the first plate 52 of the isothermal cooking plate assembly 50 is expressed in in units of calories/gram-C. The amount of heat, $\Delta Q/\Delta t$, applied to the cooking plate (in units of calories/second) is equivalent to the applied heating power to the heater circuit assembly 130 (in units of watts) divided by 4.186 to convert watts into units of calories per second.). The rate of heating, $\Delta T/\Delta t$ in Equation 6 is defined as the amount of temperature increase, $\Delta T$ (in units of Celsius degrees) divided by the amount of time, $\Delta t$ required for the temperature change (expressed in units of seconds). Referring to FIGS. 9 and 9A, Equation 6 above can then be expressed in the form of the rate of heat up, $\Delta T/\Delta t$ by rearranging terms and expressing the mass, m in terms of its constituent components as follows:

$$\Delta T/\Delta t = (\Delta Q/\Delta t)/(L13*W26*t2*\rho*C)$$ (Equation 7)

The calculated time, $t_{heatup}$ required to heat up first plate 52 of the isothermal cooking plate assembly 50 to a desired set-point temperature, $T_{setpoint}$ is determined by dividing the required temperature rise from room temperature, $T_0$ (e.g., from 25 C) to 150 C or a temperature rise of 125 C by the calculated rate of heat up, $\Delta T/\Delta t$. Accordingly, the heat-up time for first plate 50 is determined by Equation 7 as shown below:

$$t_{heatup} = (T_{setpoint} - T_0)/(\Delta T/\Delta t) = (T_{setpoint} - T_0) * (L13*W26*t2*\rho*C)/(\Delta Q/\Delta t)$$ (Eq. 8)

This computational process was used to calculate the time required to heat up the first plate 52 of isothermal cooking plate assembly 50 from 25 C to 150 C for thicknesses, t2 of first plate 52 ranging from 0.120 inch (0.305 cm) to 0.375 inch (0.953 cm) for a maximum level of applied power, ($\Delta Q/\Delta t$) of 2300 watts or 549.5 calories/second into heater circuit assembly 130 (corresponding to an input voltage of 115 volts at 20 amps). The specific heat, C of Aluminum 1100, the preferred material for the first plate 52, is 0.216 calories/gram-C and the density of Aluminum 1100 is 2.71 gram/cm$^3$. For comparison purposes with a prior art cooking plate comprised of iron, the specific heat, C value of iron is 0.124 calories/gram-C and the density of iron is 7.87 gram/cm$^3$. The length, L13 and width, W26 of the first plate 52 used in the calculation of heat up rates was based on the results of the thermal analysis of a range of sizes of first plate 52 to determine the range of sizes of first plate 52 that achieved the objective of an isothermal cooking plate assembly 50, viz., a first plate 52 in which the maximum temperature difference, $\Delta T_{max}$ between the set-point temperature, $T_{setpoint}$ and any temperature in the zone where an article of food is being cooked does not exceed 10 C for set-point temperatures, $T_{setpoint}$ up to 230 C (450 F).

A total of 118 heat transfer analyses were performed using the TRUMP computer program and the thermal models shown in FIGS. 9, 9A, 10, 11 and 12. The thermal models for these heat transfer analyses were based on a range of lengths L13, widths W26 and thicknesses t2 as defined in FIGS. 9 and 9A. The values for the density, ρ and specific heat, C for first plate 52 correspond to the published material properties for Aluminum 1100 and iron as specified above. The values for the thermal conductivity used in these heat transfer analyses ranged from 1.67 to 2.18 watts/cm-C for the case of a first plate 52 comprising aluminum and 0.675 watts/cm-C for the case of a first plate 52 comprising iron. The temperature distribution of the 320 first plate subregions 304 was determined by the TRUMP computer program under steady state conditions, i.e., under conditions in which all subregions have reached an equilibrium state in which the temperatures are no longer increasing or decreasing.

Figure 10:
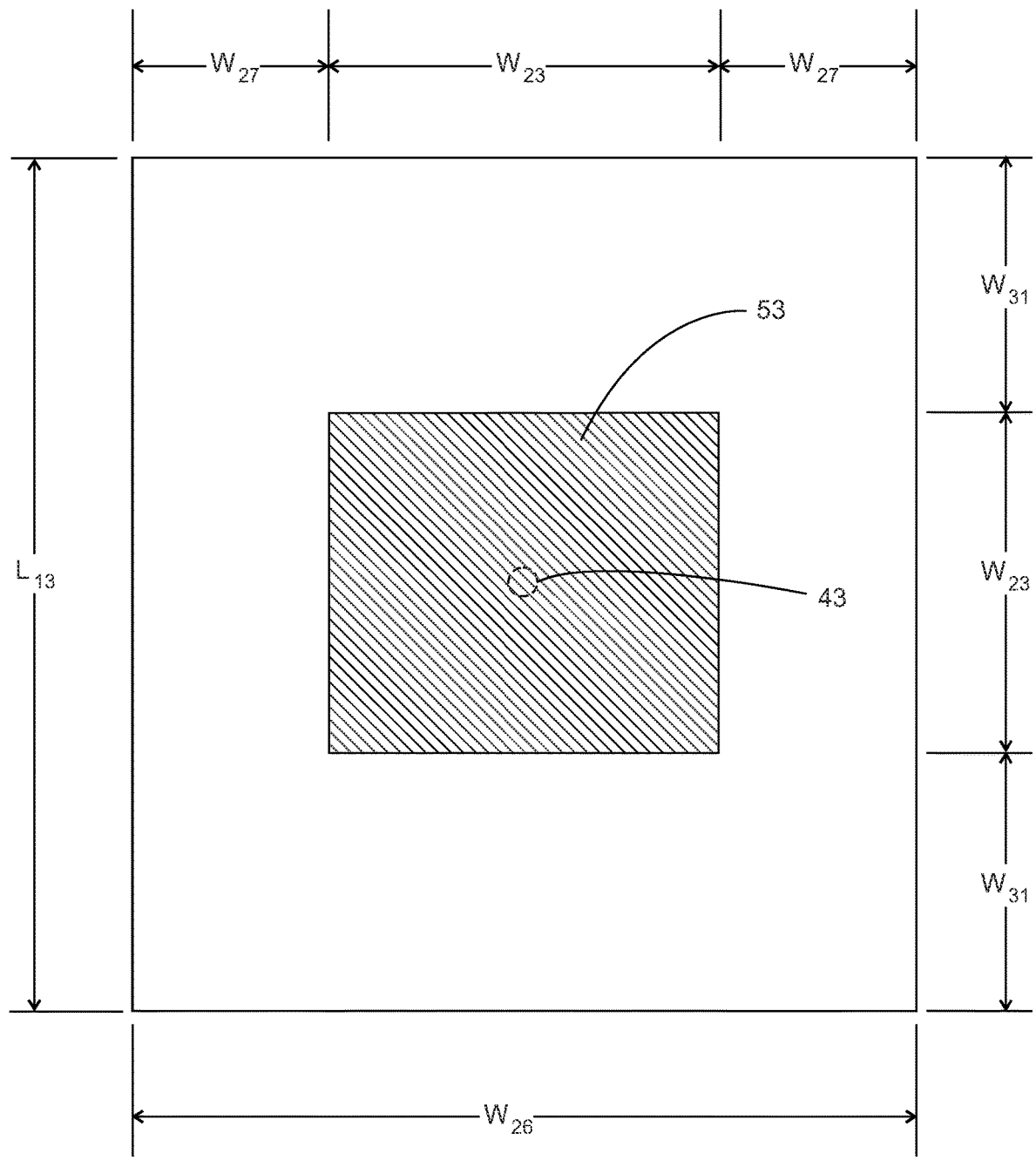
FIG. 10 is a top view of a thermal model used to perform heat transfer analyses of alternative first plate designs having a loading factor of 20% of food being cooked.
Figure 11:
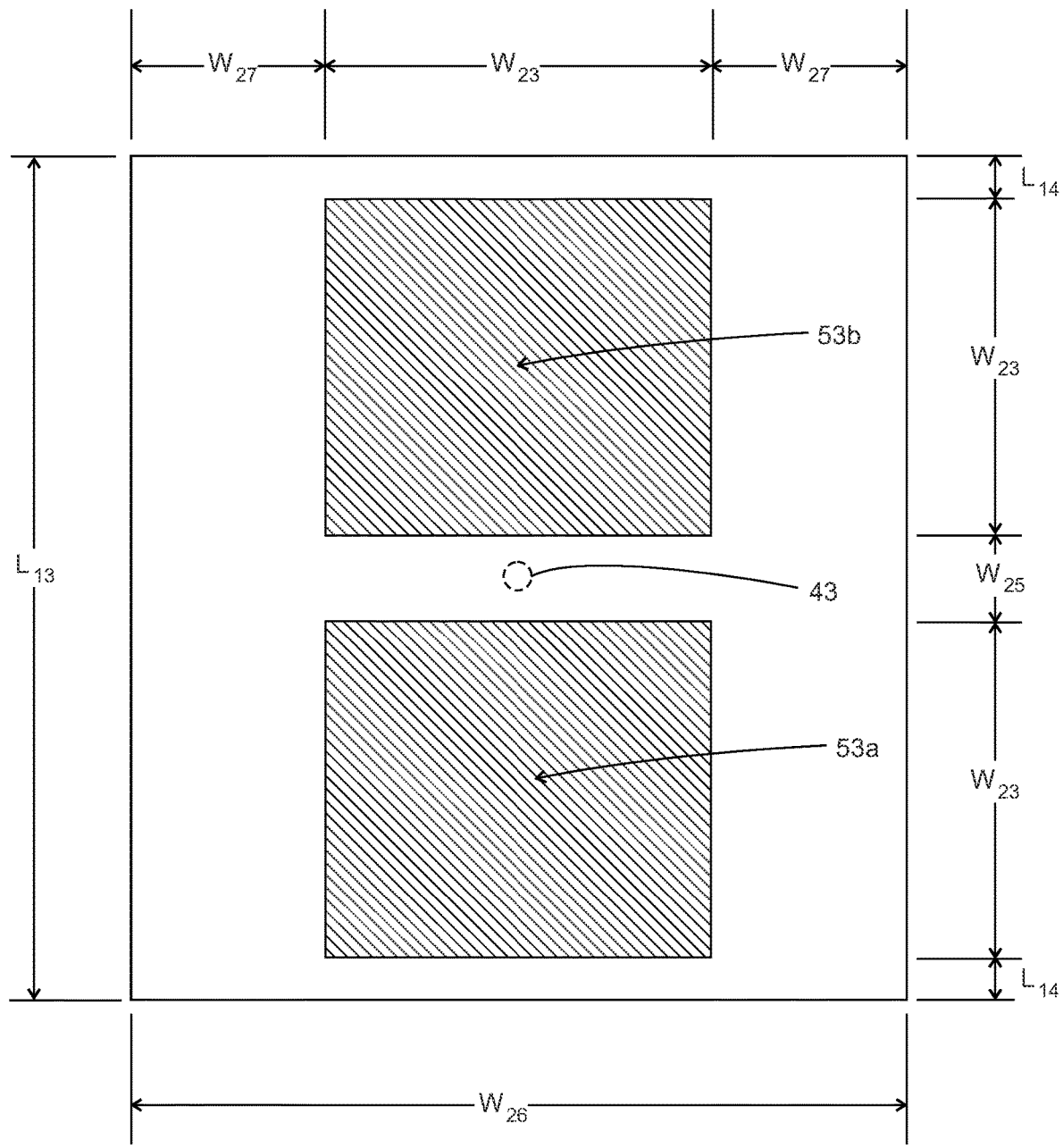
FIG. 11 is a top view of a thermal model used to perform heat transfer analyses of alternative first plate designs having a loading factor of 40% of food being cooked.
Figure 12:
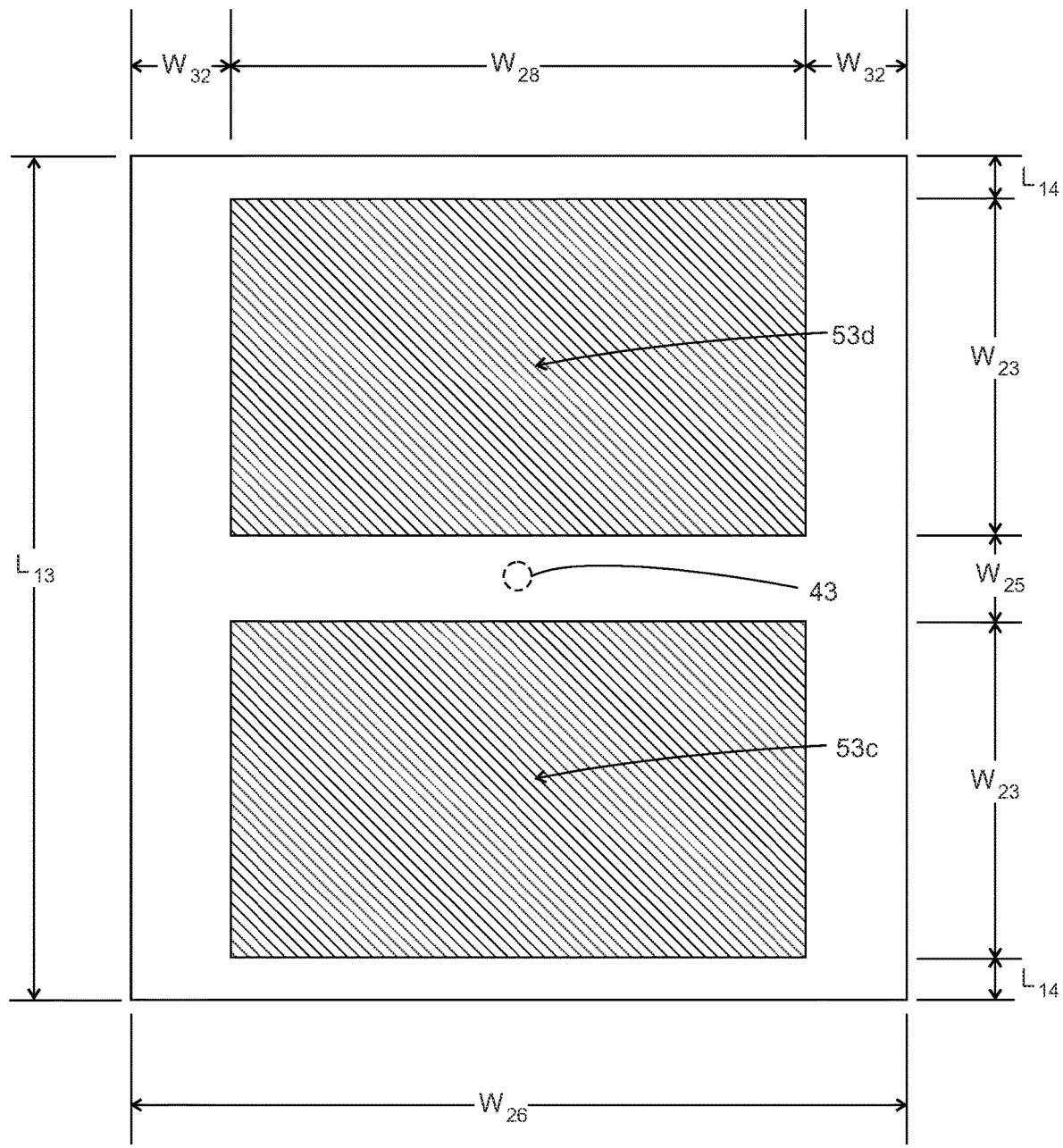
FIG. 12 is a top view of a thermal model used to perform heat transfer analyses of alternative first plate designs having a loading factor of 60% of food being cooked.

The temperature distribution among the 320 first plate subregions 304 is influenced by the loading factor of food being cooked. The term "loading factor" refers to the amount of food 53 simultaneously being cooked and the distribution of portions of food 53a, 53b, on the cooking surface 28 of first plate 52. The unit of measure of loading factor is a percentage and refers to the fraction of the total cooking surface 28 of first plate 52 covered by one or more portions of food 53. The effect of the loading factor on the temperature distribution of the 320 first plate subregions 304 was included in the 118 heat transfer analyses by specifying and performing heat transfer analyses on three different thermal models as seen in FIGS. 10, 11 and 12 corresponding to loading factors of 20%, 40% and 60%, respectively. As seen in FIG. 10, a single article of food 53 having a width and length of W23 is positioned in the central portion of the cooking surface 28 of first plate 52 having an overall length, L13 and overall width, W26 and corresponds to a loading factor of 20%. As seen in FIG. 11, two articles of food 53a and 53b, having a width and length of W23, are positioned in the central portion of the cooking surface 28 of first plate 52 having an overall length, L13 and overall width, W26 and corresponds to a loading factor of 40%. As seen in FIG. 12, two larger articles of food 53c and 53d, having a width, W23 and length, W28 are positioned in the central portion of the cooking surface 28 of first plate 52 having an overall length, L13 and overall width, W26 and corresponds to a loading factor of 60%.

The TRUMP computer program was used to perform heat transfer analyses corresponding to 118 different designs for first plate 52 comprising different materials (e.g., Aluminum and iron) and a range of lengths, widths and thicknesses and provided steady-state temperature values for the 320 first plate subregions 304 at their temperature nodes 308 (as seen in FIGS. 9 and 9A). Referring to FIGS. 1, 1B, 2 and 5, the results of these 118 heat transfer analyses provided the optimum range of lengths L2, widths W3 and uniform thicknesses t2 of first plate 52 that meet the dual requirements for an isothermal cooking plate assembly 50 that include [a] the maximum allowed temperature difference between the set-point temperature and any first plate subregion 304 in contact with food 53 is not greater than 10 C for set-point temperatures up to 230 C and [b] a maximum time period for heat-up of first plate 52 from room temperature to a set-point temperature of 150 C of not greater than 30 seconds. The preferred design for the first plate 52 that meets the objective of an isothermal cooking plate assembly 50 requires that the maximum temperature difference, $\Delta T_{max}$ between the set-point temperature, $T_{setpoint}$ and any temperature in the zone where an article of food is being cooked does not exceed 10 C for any operator-selectable set-point temperature up to 230 C (450 F).

Based on the 118 heat transfer analyses performed using the TRUMP heat transfer computer program, the optimum length, L2 for a single first plate 52 heated by a single heater circuit assembly 130 surmounted on substantially the entire surface area on the back side of the first plate 52 (i.e., opposite the food-cooking surface side) to achieve a maximum temperature difference, $\Delta T_{max}$ that does not exceed 10 C for any operator-selectable set-point temperature, $T_{setpoint}$ up to 230 C (450 F) is in the range from 7.2 to 9.0 inch. Also, based on these 118 heat transfer analyses, the optimum width, W3 for a single first plate 52 heated by a single heater circuit assembly 130 surmounted on substantially the entire surface area on the back side of the first plate 52 (i.e., opposite the cooking surface side) to achieve a maximum temperature difference, $\Delta T_{max}$ that does not exceed 10 C for any operator-selectable set-point temperature, $T_{setpoint}$ up to 230 C (450 F) is in the range from 6.0 to 7.2 inch. These optimum ranges of lengths, L2 and widths, W3 correspond to a maximum length to width aspect ratio of 9.0 inch/6.0 inch or 1.50.

Once the optimum range of lengths, L2 and widths, W3 for the first plate 52 were determined from the initial set of the heat transfer analyses, than a nominal length, L13 and width, W26 was selected for the purpose of computing the maximum temperature difference, $\Delta T_{max}$ between the set-point temperature, $T_{setpoint}$ and any temperature in the zone where an article of food is being cooked. In addition, referring to FIGS. 9, 9A, 10, 11 and 12, the nominal lengths, W23 or W28 and widths, W23 for the example articles of food 53 being cooked were selected based on typical weights and sizes of hamburgers being cooked. These dimensions and other dimensions of the thermal models seen in FIGS. 9, 9A, 10, 11 and 12 are specified in a subsequent section.

The results of the heat transfer analyses of alternative designs for first plate 52 determined the range of allowable length and width dimensions for first plate 52 that met the requirements for maintaining the maximum temperature difference between the operator-selected set-point temperature and any subregion 304 of first plate 52 in contact with one or more articles of food 53 to 10 C or less. The allowable length and width dimensions for first plate 52 (viz., a length in the range 7.2 to 9.0 inches and width in the range 6.0 to 7.2 inches), length-to-width aspect ratio of not greater than 1.5 and surface are not greater than 54 square inches in combination with the allowable range of thicknesses of first plate 52 (viz., 0.187 to 0.275 inch) result in a volume of first plate 52 that can be heated up from 25 C to 150 C in less than 30 seconds using widely available line power of 115 volts at a maximum current of 20 amps. As a consequence, the preferred embodiments of the present disclosure eliminate the need for a 220 volt source of power and all of the associated construction complexities and costs of providing and using this higher voltage electrical service. In addition, the two-fold higher heat flux associated with powering the thick-film printed and fired heater circuit assembly 130 at 220 volts and 20 amps (i.e., 4,400 watts of power) is unnecessary to achieve a rapid heat-up within 30 seconds and only adds to the temperature difference across the interface between the thick-film printed and fired heater circuit assembly 130 and first plate 52. The only advantage of using of a source of 220-volt line power is to reduce the heat-up time from room temperature to the operator-selected set-point temperature. However, a maximum heat-up time of 30 seconds for a griddle system 10 powered by the widely available 115 volts and 20 amps eliminates the need for 220-volt line power source since the further reduction in heat-up time does not compensate for the added cost of supplying 220-volt service and operating the griddle system 10 at the voltage levels and the higher costs associated with the adhesives and the their application for use at the higher heat flux levels associated with the application of 4,400 watts of power per isothermal cooking plate assembly 50.

Figure 13:
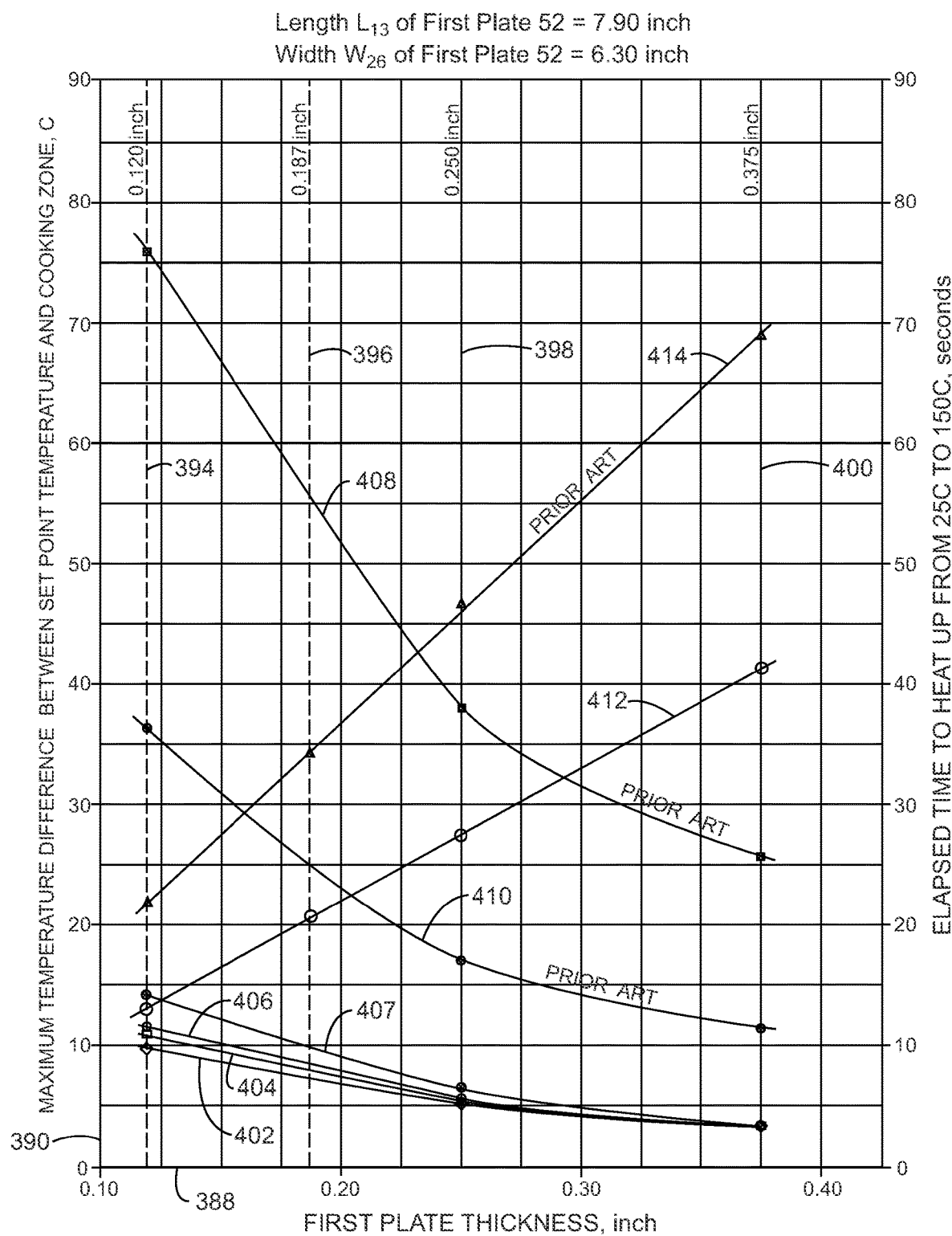
FIG. 13 is a graphical representation of the results of heat transfer analysis and calculations of time periods required for heat up of alternative first plate designs.

The results of the heat transfer analysis using the TRUMP computer program for thermal models seen in FIGS. 9, 9A, 10, 11 and 12 and nominal dimensions specified below are presented in FIG. 13. As seen in FIG. 13, the left ordinate is the maximum temperature difference, $\Delta T_{max}$ (in units of Celsius degrees) corresponding to the maximum temperature difference between the set-point temperature, $T_{setpoint}$ and any first plate subregion 304 within the cooking zone (i.e., zone of first plate 52 covered by one or more articles of food 53). Still referring to FIG. 13, the abscissa is the thickness of first plate 52 in units of inches. The heat transfer analyses were performed for thermally conductive first plate 52 thicknesses, t2 that included 0.120, 0.250 and 0.375 inch thickness, as seen in FIG. 13 at vertical lines 394, 398 and 400, respectively. First plate 52 thicknesses of 0.120, 0.250 and 0.375 inch were selected for heat transfer analyses since they correspond to standard commercially available sheets of Aluminum Types 1100 and 6061 in lengths of 48 inches and widths of 24 inches.

Curves 402, 404 and 406 in FIG. 13 for loading factors of 20%, 40% and 60%, respectively, correspond to the heat transfer analyses derived maximum temperature differences between the set-point temperature, $T_{setpoint}$ and any first plate subregion 304 within the cooking zone (i.e., zone of first plate 52 covered by one or more articles of food 53) based on data point values seen at first plate thicknesses of 0.120, 0.250 and 0.375 inch, respectively, for an aluminum first plate 52 having a length of 7.9 inch, width of 6.3 inch and thermal conductivity of 2.18 watts/cm-C corresponding to Aluminum Type 1100. Curve 407 in FIG. 13 for a loading factor of 60% corresponds to the heat transfer analyses derived maximum temperature differences between the set-point temperature, $T_{setpoint}$ and any first plate subregion 304 within the cooking zone (i.e., zone of first plate 52 covered by one or more articles of food 53) based on data point values seen at first plate thicknesses of 0.120, 0.250 and 0.375 inch, respectively, for an aluminum first plate 52 having a length of 7.9 inch, width of 6.3 inch and thermal conductivity of 1.67 watts/cm-C corresponding to Aluminum Type 6061.

Still referring FIG. 13, curves 408 and 410 for loading factors of 60% and 40%, respectively, correspond to the heat transfer analyses derived maximum temperature differences between the set-point temperature, $T_{setpoint}$ and any first plate subregion 304 within the cooking zone (i.e., zone of first plate 52 covered by one or more articles of food 53) based on data point values seen at first plate thicknesses of 0.120, 0.250 and 0.375 inch, respectively, for a first plate 52 having a length of 7.9 inch, width of 6.3 inch and thermal conductivity of 0.675 watts/cm-C corresponding to iron (prior art).

The first plate 52 is substantially uniform in thickness and in the form of a continuous sheet. The term "continuous sheet", as used herein to specify first plate 52, refers to a thermally conductive first plate 52 having a substantially uniform thickness without any partial or full thickness cutouts or slots other than [a] a small blind (i.e., partial depth) machined hole 45 at the geometrical center on the side of first plate 52 opposite the cooking side for mechanically securing temperature sensor 39 to first plate 52 and [b] small machined holes at the perimeter corners of first plate 52 opposite the cooking side for mechanically securing first plate 52 to second plate 30 using machine screws 82 having a diameter D3.

As seen in FIG. 13, curves 402, 404 and 406 represents the computed maximum temperature difference, $\Delta T_{max}$ for a first plate 52 comprising aluminum having a thermal conductivity of 2.18 watts/cm-C for loading factors of 20%, 40% and 60%, respectively. The computed maximum temperature difference, $\Delta T_{max}$ for a first plate 52 comprising aluminum having a thermal conductivity of 2.18 watts/cm-C and having a uniform thickness of 0.187 inch ranges from 7.3 C to 8.3 C and ranges from 5.3 C to 5.6 C at a thickness of 0.250 inch (see curves 402, 404 and 406 of FIG. 13). As seen in curve 407 of FIG. 13, the computed maximum temperature difference, $\Delta T_{max}$ for a first plate 52 comprising aluminum having a thermal conductivity of 1.67 watts/cm-C and having a uniform thickness of 0.187 inch is 10.0 C and is 6.6 C at a thickness of 0.250 inch. First plate 52 materials having a thermal conductivity of at least 1.67 watts/cm-C include Aluminum 6061, Aluminum 6063 and Aluminum 1100 or cast aluminum alloys.

Still referring to FIG. 13, prior-art cooking plates specified in U.S. Pat. No. 5,552,308, incorporated herein by reference in its entirety, comprising an iron cooking plate result in a much higher maximum temperature difference, $\Delta T_{max}$ for a first plate 52 having the same dimensions as the first plate 52 of the present disclosure used to derive curves 402, 404 and 406. As seen in FIG. 13 for prior art curve 408 corresponding to thermal model seen in FIG. 10 having a loading factor of 20%, the maximum temperature difference, $\Delta T_{max}$ is 56 C at a first plate 52 thickness of 0.187 inch or more than a 7× greater maximum temperature difference, $\Delta T_{max}$ than the present disclosure at the same first plate 52 thickness, t2. As seen in FIG. 13 for prior art curve 410 corresponding to thermal model seen in FIG. 11 having a loading factor of 40%, the maximum temperature difference, $\Delta T_{max}$ is 25 C at a first plate 52 thickness of 0.187 inch or more than a 3× greater maximum temperature difference, $\Delta T_max$ than the present disclosure at the same first plate 52 thickness, t2. Even at a first plate 52 thickness of 0.375 inch, the maximum temperature difference, $\Delta T_{max}$ for the prior art cooking plate at a loading factor of either 20% or 40% still exceeds the upper limit of 10 C for the isothermal cooking plate assembly 50.

Still referring to FIG. 13, Equation 8 was used to calculate the time required to heat up first plate 52 from room temperature (e.g., 25 C) to a typical cooking temperature (e.g., 150 C) for the case in which first plate 52 has length L13, width W26 and comprised of either aluminum or iron (i.e., prior art). As seen in FIG. 13, the times required to heat up first plate 52 having a length, L13 of 7.90 inch and width, W26 of 6.30 inch were calculated at first plate 52 thicknesses of 0.120, 0.187, 0.250 and 0.375 inch as seen at vertical lines 394, 396, 398 and 400, respectively, resulting in curves 412 and 414 for first plates 52 comprising aluminum and iron, respectively. First plate 52 thicknesses of 0.120, 0.187, 0.250 and 0.375 inch were selected for the calculation of the time required to heat up first plate 52 from room temperature since these thicknesses correspond to standard commercially available sheets of Aluminum Types 1100 and 6061 having lengths of 48 inches and widths of 24 inches. For the case of an aluminum first plate 52 of the present disclosure, the time required to heat up from 25 C to 150 C is seen in curve 412 of FIG. 13 based on a current input of 20 amps at 115 volts (e.g., standard line voltage). As seen in curve 412 of FIG. 13 for the case of a first plate 52 of the present disclosure comprised of aluminum and having a thickness of 0.187 inch, the time required to heat up first plate 52 from 25 C to 150 C is about 20 seconds. For the case of a first plate 52 of the present disclosure comprised of aluminum and having thickness of 0.250 inch, the time required to heat up first plate 52 from 25 C to 150 C is about 27 seconds. In contrast, as seen in curve 414 of FIG. 13 for the case of a first plate 52 of the prior art comprised of iron and having thickness of 0.187 inch, the time required to heat up first plate 52 from 25 C to 150 C is about 35 seconds and for a thickness of 0.250 inch, the time required to heat up first plate 52 from 25 C to 150 C is about 46 seconds.

A preferred arrangement for the removable attachment of first electrical lead wire 158 and second electrical lead wire 160 to first electrical contact pad 62 and second electrical contact pad 64, respectively, is seen in FIG. 5. The proximal ends of first electrical lead wire 158 and second electrical lead wire 160 are electrically connected, by way of example, to solid-state relay at controller 20. By way of example, the distal ends of first electrical lead wire 158 and second electrical lead wire 160 are terminated at first washer-type electrical contact 150 and at second washer-type electrical contact 152, respectively. First electrical contact pad 62 and second electrical contact pad 64 as well as first electrical lead wire 158 and second electrical lead wire 160, respectively, traverse across thermally insulative second plate 30 of low thermal conductivity material through first opening or drilled through-hole 57 and second opening or drilled through-hole 58, respectively.

By way of example, first drilled through-hole 57 and second drilled through-hole 58 have diameters, D14 and extend through the full thickness of second plate 30 of low thermal conductivity material. Mechanical fastening screws 154, 156 traverse first washer-type electrical contact 150 and second washer-type electrical contact 152 respectively, as well as holes 66, 68 in first electrical contact pad 62 and second electrical contact pad 64, respectively. Mechanical fastening screws 154, 156 are received in threaded holes 162 and 164, respectively. Belleville disc springs 166, 168 of height H3 and thickness 118, preferably a stack of at least two, are arranged to maximize deflection distance and are selected having an outside diameter and inside diameter matched to outside diameter, D9 of mechanical fastening screws 154, 156 and outside diameter of washer-type electrical contacts 150, 152. By way of example, stainless steel Type 302 Belleville disc springs 166, 168 are available from McMaster-Carr Supply Company Supply (Cleveland, Ohio).

Still referring to FIG. 5, the application of torque to mechanical fastening screws 154, 156 induces compression of Belleville disc springs 166, 168, thereby achieving and maintaining sufficient mechanical contact pressure to minimize electrical contact resistance between first washer-type electrical contact 150 and second washer-type electrical contact 152 and first electrical contact pad 62 and second electrical contact pad 64, respectively.

Still referring to FIG. 5, distal end of temperature sensor 39 is seen inserted through full-thickness hole 48 of diameter D7 in second plate 30. The proximal end of temperature sensor 39 is connected to controller 20 (not shown) for controlling temperature of first plate 52.

By way of example, a cross section of thick-film printed and fired heater circuit assembly 130 affixed to bottom surface of first plate 52 of high thermal conductivity material is seen in FIG. 6 as referenced in FIG. 5. As seen in greater detail in the cross-sectional view in FIG. 6 in combination with top views seen in FIGS. 3 and 4, a thick-film printed and fired heater circuit assembly 130 is a composite 60 disposed on and substantially covering back surface area 159 of first plate 52 and comprising: (i) thick-film printed and fired first electrically insulative layer 141 of thickness t12 disposed on the back surface area 159 of first plate 52, (ii) thick-film printed and fired second electrically resistive heating element leg 144 disposed on previously thick-film printed and fired first electrically insulative layer 141, and (iii) optional thick-film printed and fired fourth electrically resistive cover layer 142 disposed on previously thick-film printed and fired second electrically resistive heating element leg 144.

Figure 6A:
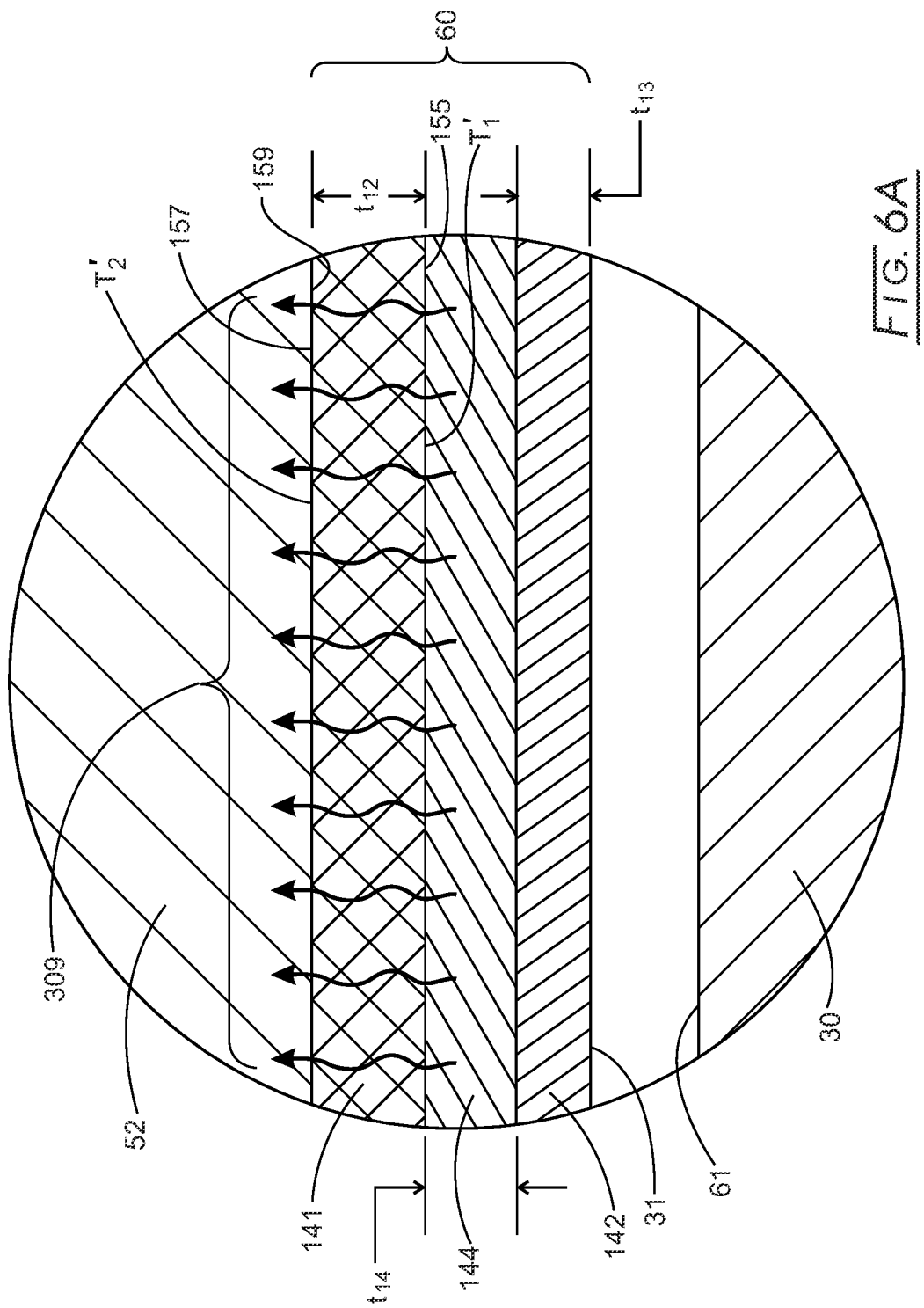
FIG. 6A is a more detailed enlarged partial view of first plate of high thermal conductivity material, thick-film printed and fired heater circuit assembly and second plate of low thermal conductivity material showing boundary temperatures and conduction heat flow path through first electrically insulative layer on first and second face of first electrically insulative layer.

A more detailed partial view of a cross section of a thick-film printed and fired heater circuit assembly 130 affixed to bottom surface of first plate 52 of high thermal conductivity material is seen in FIG. 6A as referenced in FIG. 5. As seen in even greater detail in FIG. 6A in combination with top views seen in FIGS. 3 and 4, a thick-film printed and fired heater circuit assembly 130 is a composite 60 disposed on and substantially covering back surface area 159 of first plate 52 and comprising: (i) first electrically insulative layer 141 of thickness t12 disposed on the back surface area 159 of first plate 52, (ii) thick-film printed and fired second electrically resistive heating element leg 144 disposed on previously thick-film printed and fired first electrically insulative layer 141; and (iii) optional thick-film printed and fired fourth electrically resistive cover layer 142 disposed on previously thick-film printed and fired second electrically resistive heating element leg 144. As seen in FIG. 6A, heat generated within second resistive heating element leg 144 is transported through first electrically insulative layer 141 by thermal conduction as represented by heat flow paths 309.

As specified in the preceding sections, the thermal conduction of heat, Q through a solid having a substantially uniform thickness, t can be expressed by Equation 1. For the specific case of heat conduction through the thick-film printed and fired first electrically insulative layer 141 of the present invention, the resulting temperature difference, $(T_1'-T_2')$ across the thickness, $t_{dielectric}$ of the thick-film printed and fired first electrically insulative layer 141 can be expressed in terms of the amount of heat conducted through the through the thick-film printed and fired first electrically insulative layer, $Q_{heater}$, as well as the area through which heat is conducted, $A_{heater}$, the thickness, $t_{dielectric}$ of the thick-film printed and fired first electrically insulative layer and the thermal conductivity, $k_{dielectric}$ of the thick-film printed and fired first electrically insulative layer as seen in Equation 1B. The temperature $T_1'$ refers to the temperature on first surface 155 of first electrically insulative layer 141 as seen in FIG. 6A. Likewise, the temperature $T_2'$ refers to the temperature on first surface 157 of first electrically insulative layer 141 as seen in FIG. 6A.

Referring next to FIG. 7, second plate 30 of low thermal conductivity material is seen in both top view and side view providing a specification for the dimensions of the second plate 30 of low thermal conductivity material as well as the location of six holes 84 for passage of mechanical fastening screws 82 that secure first plate 52 of high thermal conductivity material to second plate 30 of low thermal conductivity material. Also, the locations of first through-hole 57 of diameter D14, second through-hole 58 of diameter D14 and third through-hole 48 of diameter D7 are seen in FIG. 7. The through-holes, 57, 58 and 48 align with threaded holes 162, 164 and 45, respectively, in first plate 52, as seen in FIG. 5.

The range of dimensions for the griddle system 10 and its components, as seen in FIGS. 1, 1B, 2, 3A, 3B, 4, 5, 6, 7, 9, 9A, 10, 11 and 12 are summarized below in units of inches:

| | |
|---|---|
| L1 = 9.0 to 12.0 | L9 = 3.6 to 4.2 |
| L2 = 7.2 to 9.0 | L10 = 3.4 to 4.0 |
| L3 = 7.5 to 10.0 | L11 = 2.6 to 3.2 |
| L4 = 7.0 to 8.3 | L12 = 2.0 to 2.6 |
| L5 = 6.0 to 8.5 | L13 = 7.9 |
| L6 = 0.75 to 1.5 | L14 = 0.394 |
| L7 = 0.32 to 0.82 | L15 = 1.8 to 3.6 |
| W1 = 12 to 54 | W16 = 0.05 to 0.20 |
| W2 = 6.3 | W17 = 0.05 to 0.25 |
| W3 = 6.0 to 7.7 | W18 = 0.02 to 0.25 |
| W4 = 5.9 to 7.6 | W19 = 0.40 to 1.00 |
| W5 = 2.0 to 4.0 | W20 = 0.003 to 0.100 |
| W6 = 0.05 to 0.25 | W21 = 0.003 to 0.100 |
| W7 = 0.02 to 0.08 | W22 = 0.02 to 0.25 |
| W8 = 0.003 to 0.100 | W23 = 3.15 |
| W9 = 0.20 to 0.35 | W24 = 0.4 |
| W10 = 0.01 to 0.03 | W25 = 0.8 |
| W11 = 0.02 to 0.08 | W26 = 6.3 |
| W12 = 0.05 to 0.25 | W27 = 1.57 |
| W13 = 0.05 to 0.25 | W28 = 4.72 |
| W14 = 0.01 to 0.04 | W29 = 0.394 |
| W15 = 0.30 to 0.80 | W30 = 2.9 TO 3.4 |
| H1 = 4.0 TO 10.0 | W31 = 2.37 |
| H2 = 2.0 TO 6.0 | W32 = 0.79 |
| H3 = 0.012 to 0.030 | D8 = 0.11 to 0.22 |
| D2 = 0.10 to 0.20 | D9 = 0.10 to 0.20 |
| D3 = 0.10 to 0.20 | D10 = 0.110 to 0.220 |
| D4 = 0.10 to 0.20 | D11 = 0.120 to 0.250 |
| D5 = 0.10 to 0.20 | D12 = 0.120 to 0.250 |
| D6 = 0.10 to 0.25 | D13 = 0.110 to 0.220 |
| D7 = 0.187 to 0.375 | D14 = 0.187 to 0.375 |
| t1 = 0.02 to 0.10 | t10 = 0.02 to 0.08 |
| t2 = 0.150 to 0.250 | t11 = 0.0005 to 0.005 |
| t3 = 0.25 to 0.75 | t12 = 0.0002 to 0.0040 |
| t4 = 0.25 to 1.00 | t13 = 0.0005 to 0.002 |
| t5 = 0.08 to 0.20 | t14 = 0.0003 to 0.003 |
| t6 = 0.05 to 0.20 | t15 = 0.0005 to 0.003 |
| t7 = 0.05 to 0.20 | t16 = 0.000008 to 0.000020 |
| t8 = 0.05 to 0.20 | t17 = 0.04 to 0.15 |
| t9 = 0.025 to 0.125 | t18 = 0.007 to 0.015 |
| | t19 = 0.04 to 0.19 |
| | t20 = 0.45 to 0.70 |

Figure 8C:
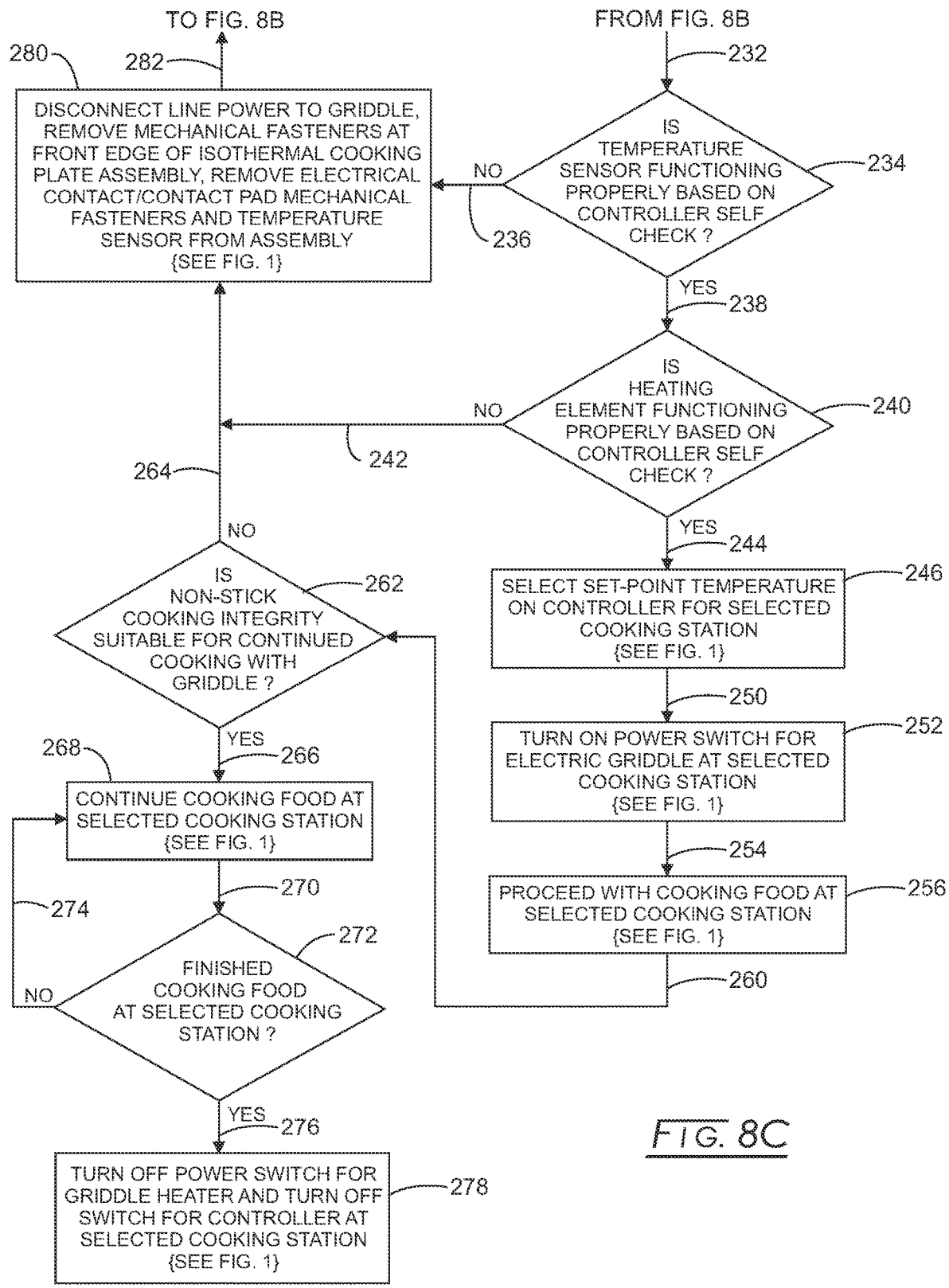

The manufacturing process for constructing the preferred embodiment disclosed in connection with FIGS. 1, 1B, 3A, 3B, and 4-7 as well as the method of use of griddle system 10 are set forth in the flow chart represented in FIGS. 8A-8C. Those figures should be considered as labeled thereon. Looking to FIG. 8A, the procedure commences with fabricating second plate 30 of low thermal conductivity material (e.g., by injection molding or machining from sheet material) with through holes for passage of electrical lead tabs and temperature sensor as seen at block 170. By way of example, injection-molding resins may advantageously include polyetherimide or polyphenylene sulfide from sources identified in a preceding section of this specification. The fabrication of the thermally insulative second plate 30 using only injection molding processes provides the advantage of minimizing the cost of this component and, thereby, minimizing the overall cost of the replaceable isothermal cooking plate assembly 50.

Next and still referring to FIG. 8A, a first plate 52 of high thermal conductivity material (e.g., Aluminum 1100 sheet having thickness in the range from 0.187 to 0.250 inch) is machined to the preferred length and width dimensions with mechanical fastening holes being drilled and tapped at locations matching through-holes 57, 58 and 48 in second plate 30 as seen at arrow 172 and block 174.

Still referring to FIG. 8A, a heater circuit assembly 130 is next disposed on the back side surface 29 of first plate 52 in accordance with the following sequence of thick-film printing and firing steps. In a first step, one or more electrically insulative layers 141 are thick-film printed and fired on substantially the entire back side surface 29 of first plate 52, having a total thickness, $t_{12}$, as seen at arrow 176 and block 178. As seen in Equation 1J and specified above in Examples 1 2 and 3, the maximum allowed thickness, $t_{dielectric}$ of a thick-film printed and fired first electrically insulative layer 141 is directly proportional to the thermal conductivity, $k_{dielectric}$ of the first electrically insulative layer (following printing and firing) and is inversely proportional to the maximum applied heat flux. The maximum applied heat flux occurs during the rapid heat-up of the first plate 52 of an isothermal cooking plate assembly 50 of a griddle system 10 to the operator-selected set point temperature (e.g., 150 C).

In a second step, electrically conductive bus strips 132a and 132b are printed on first electrically insulative layer 141 as seen at arrow 180 and block 182. In a third step, electrically resistive heating element legs 144 and 145 are thick-film printed and fired on the first electrically insulative layer 141 such that the ends of each leg are printed on and are in electrical communication with the electrically conductive bus strips as seen at arrow 184 and block 186. In a fourth step, an electrically insulative cover layer 142 is thick-film printed and fired over electrically conductive bus 132a, 132b (except at locations of contact pads 62 and 64) and electrically resistive heating element legs 144 and 145, having thickness $t_{13}$, as seen at arrow 188 and block 190. By way of example and without limitation, thick-film pastes for the [a] first one or more electrically insulative layers 141, [b] second electrically conductive bus strips 132, [c] electrically resistive heating element legs 144 and [d] electrically insulative cover layer 142 may be procured from Heraeus Electronics (Hanau, Germany) or DuPont Microcircuit Materials (Research Triangle Park, North Carolina).

Still referring to FIG. 8A, upon completion of the deposition of the multi-layer heater circuit assembly 130 on the back side surface 29 of first plate 52, a non-stick coating is next applied to the top cooking surface 28 of first plate 52 as seen at arrow 192 and block 194. The use of a non-stick coating on the cooking surface 28 serves to minimize adherence of food 53 (not shown) to the first plate surface during cooking process as well as minimize the need for additional cooking oils and fats during the cooking process. Alternative high-temperature non-stick coatings include polytetrafluoroethylene as well as ceramic non-stick coatings. A preferred embodiment of the griddle system of the present disclosure incorporates the use of a non-stick coating. A particular advantage of the griddle system of the present disclosure is the ability to replace the relatively low-cost isothermal cooking plate assembly 50 at such time as the non-stick coating release characteristic degrades following extended cooking use or as a result of an electrical failure within the electrically resistive heating element, the rapid and convenient replacement being performed without the need for replacement of temperature sensor 39, controller 20, or structural components of griddle system 10 including front panel 12, left side panel 14, right side panel 16, or rear panel 18.

Referring now to FIG. 8B, the first plate/heater subassembly completed in block 194 is next mechanically attached to thermally insulative second plate 30 with an intervening gasket (e.g., silicone rubber) of thickness $t_6$ around the perimeter of the interface between first plate 52 and the thermally insulative second plate 30 to form isothermal cooking plate assembly 50 as seen in FIG. 2 and identified in block 202 and arrow 204. The intervening perimeter gasket of thickness $t_6$ results in an air gap 203 between the first plate and the thermally insulative second plate 30 as seen in FIGS. 5 and 6. This air gap 203 of thickness $t_{19}$, combined with the low thermal conductivity of the plastic material selected for the thermally insulative second plate 30, serves to minimize heat losses from the back side surface 29 of first plate 52 (i.e., the side opposite the cooking surface 28) and thereby increase the overall efficiency of the griddle system during use. In addition, based on a preferred embodiment of the present disclosure, reducing the elapsed time for heating up a griddle to cooking temperature level from 10 to 20 minutes to about 15 to 30 seconds for heating up a griddle to cooking temperature level enables the griddle system of the present disclosure to be turned off between uses, thereby eliminating power consumption during idle periods during which no cooking is being performed. The combination of [a] the reduced heat and associated power losses during the cooking period through the incorporation of a thermally insulative second plate 30 and thermally insulative air gap 203 in the griddle system and [b] the capability to turn off electrical power to the first plate between uses enables the achievement of a high efficiency level since minimal heating power is required and only during the actual cooking period. The cost for materials and labor to manufacture and test the isothermal cooking plate assembly 50, as seen in FIG. 5 and specified in the manufacturing steps seen in blocks 170 through 202 of FIG. 8A, is estimated to be less than $100.

In the discourse that follows, reference is frequently made steps related to a single isothermal cooking plate assembly 50. However, it should be understood that the steps are repeated for each isothermal cooking plate assembly 50 included in a complete griddle system 10 as specified, by way of example, in FIG. 8B. Still referring to FIG. 8B, griddle system is assembled as identified in block 208 and arrow 210 and includes [a] support members for isothermal cooking plate assembly 50 located along the interior of front and rear griddle system panels, [b] stabilization pins located on rear panel of griddle system, [c] one or more controller/solid state relay unit and associated power switch corresponding to the number of cooking stations and [d] one or more heater power switches corresponding to the number of cooking stations as seen in FIGS. 1 and 2. The next assembly step involves the mechanical attachment of the distal ends of first and second electrical leads 158 and 160 to first and second electrical contact pads 62 and 64, respectively, wherein the first and second electrical contact pads 62 and 64 are disposed on the third electrically conductive bus strips 132 as seen in FIG. 5 and as identified at block 206 and arrow 212. Next, the proximal ends of first and second electrical leads are attached to each controller/solid state relay unit as identified at block 214 and arrow 216. Next, mechanically attach washer-type thermocouple temperature sensor 39 to first plate 52 as seen in FIG. 5 and attach proximal ends of temperature sensor leads to controller as identified at block 218 and arrow 220. Finally, align stabilization pin receptacle holes in thermally insulative second plate 30 with stabilization pins affixed to rear panel of griddle system and translate thermally insulative second plate 30 towards rear panel of griddle system so that stabilization pins enter and engage stabilization pin receptacle holes. Next, align holes at front end of thermally insulative second plate 30 with threaded holes in thermally insulative mounting support and complete attachment of thermally insulative second plate 30 using mechanical fasteners as seen in FIG. 2 and as identified in block 222 and arrow 224. Having completed this last step, the assembly of the griddle system is complete as seen in FIG. 1 and as identified in block 226 and arrow 228.

Referring now to FIG. 8C, the next sequence of steps refers to operation of the griddle system 10 for the purpose of cooking food 53. The first step in the use of a selected station of the griddle system 10 is to turn on the controller using the controller on/off switch as identified at block 230. As represented at arrow 232 and block 234, an electrical test is automatically performed by the controller to determine if the temperature sensor is functioning properly. In the event the temperature sensor is not functioning properly, a visual cue will be displayed and it will be necessary to detach the isothermal cooking plate assembly 50 from the front and rear supports within the griddle assembly so that temperature sensor can be replaced as identified in prior block 218 and arrow 220. Following replacement of the temperature sensor, the isothermal cooking plate assembly 50 can be reattached to the front and rear panels of griddle system as identified in prior block 222 and arrow 224. Still referring now to FIG. 8C, after temperature sensor electrical test and replacement (if needed), the next step is an electrical test that is automatically performed by the controller to determine if the heating element is functioning properly as represented at arrow 238 and block 240. In the event the new temperature sensor or, on the other hand, the original temperature sensor is functioning properly, the operation of the griddle systems proceeds to the next step as identified by arrow 238 and block 240. In block 240, an electrical test is automatically performed by controller to determine if the electrically resistive heating element resistance is within a predetermined acceptable range. If the electrically resistive heating element resistance is not within a predetermined acceptable range, a visual cue will be displayed at it will be necessary to detach the isothermal cooking plate assembly 50 from the front and rear supports within the griddle assembly so that a new isothermal cooking plate assembly 50 replaces the defective isothermal cooking plate assembly 50 by returning to block 206 following path indicated by arrows 242 and 264 to block 280 followed by arrow 282 to block 284 and finally path 286 to repeat sequential steps as represented in blocks 206, 214, 218 and 222. On the other hand, if resistive heating element resistance is within a predetermined acceptable range, then the operation of the griddle system proceeds to the next step as identified by arrow 244 and block 246.

Still referring to FIG. 8C, the next step in the operation of the griddle system 10 is the selection of the set-point temperature by the user and display of the set-point temperature by the controller as illustrated in FIG. 1 and as represented by block 246 and arrow 250. Next, upon the intended start of cooking at selected station of griddle system, operator turns on power to heater at selected station and waits about 15 to 30 seconds for first plate 52 to heat up to selected set-point temperature as indicated by display on controller seen in FIG. 1 and as identified by block 252. Once the first plate temperature reaches the user selected set-point temperature, cooking commences as identified in arrow 254 and block 256. During or after the period of cooking, the user visually inspects the non-stick coating, if used, on the surface of the first plate as identified by arrow 260 and block 262. If the integrity of the non-stick coating is unsuitable for continued cooking then it will be necessary to detach the isothermal cooking plate assembly 50 from the front and rear supports within the griddle assembly so that a new isothermal cooking plate assembly 50 replaces the defective isothermal cooking plate assembly 50 by returning to block 206 following path indicated by arrow and block 264 to block 280 followed by arrow 282 to block 284 and finally path 286 to repeat sequential steps as represented in blocks 206, 214, 218 and 222. On the other hand, if the integrity of the non-stick coating is suitable for continued cooking, then cooking may continue as seen in arrow 266 leading to block 268. The user next decides if cooking at selected station of griddle system has been completed as identified at block 272. If cooking has not been completed, continue cooking as identified by arrow 274 and block 268. On the other hand, if cooking has been completed, turn off power switch to griddle heater and power switch to controller as seen in FIG. 1 and as identified at block 278.

While the apparatus, method, and system have been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims. All citations referred herein are expressly incorporated herein by reference.

The invention claimed is:

1. An isothermal cooking plate assembly (50) mechanically attached within a griddle system (10) and comprising:
   (a) a first plate (52) of high thermal conductivity material comprising aluminum whose thickness is substantially uniform, having a thermal conductivity of at least 1.67 watts/cm-C, a surface area of not greater than 54 square inches, a length-to-width aspect ratio that does not exceed about 1.5, a thickness in the range of 0.187 to 0.250 inches, and having a back surface (159) and an oppositely disposed top food-cooking surface (28);
   (b) a thick-film printed and fired heater circuit assembly (130) disposed on and substantially covering the first plate back surface (159) and comprising:
      (i) a first glass thick-film printed and fired electrically insulative layer (141) disposed on the first plate back surface (159) having a thickness that does not exceed a maximum allowed thickness, $t_{dielectric}$ of the glass thick-film printed and fired first electrically insulative layer, the maximum allowed thickness, $t_{dielectric}$ corresponding to the maximum allowable thickness of the first electrically insulative layer that avoids the fracture, cracking and/or breaking of the thick-film printed and fired first electrically insulative layer during rapid heat-up of the aluminum first plate, the maximum allowed thickness, $t_{dielectric}$ calculated using the equation (Equation 1H):

$$t_{dielectric} = [\{\sigma_{dielectric} * (1-\mu)\}/\{\alpha_{dielectric} * E_{dielectric}\}] * [k_{dielectric}/\{Q_{heater}/A_{heater}\}],$$

wherein the calculated maximum allowed value for the thickness, $t_{dielectric}$ of the glass thick-film printed and fired first electrically insulative layer is based on maximum level of applied heat flux, $\{Q_{heater}/A_{heater}\}$ and known thermal conductivity, $k_{dielectric}$ of the glass thick-film printed and fired first electrically insulative layer as well as the known properties of glass including the breaking strength of glass, $\sigma_{dielectric}$; modulus of elasticity, $E_{dielectric}$ coefficient of thermal expansion, $\alpha_{dielectric}$ and Poisson's ratio, $\mu$;
      (ii) third electrically conductive bus strips (132a and 132b) thick film printed onto the previously thick-film printed and fired first surface of first electrically insulative layer;
      (iii) second electrically resistive heating element legs (144a-144r and 145) thick-film printed and fired on previously thick-film printed and fired first surface of first electrically insulative layer and extending onto the previously thick-film printed and fired third electrically conductive bus strips to effect electrical communication between the second electrically resistive heating element legs and the third electrically conductive bus strips; and
      (iv) distal ends of first and second electrical leads (158, 160) removably attachable to first and second contact pads (62, 64), respectively, wherein the first and second electrical contact pads are disposed on the third electrically conductive bus strips; and
   (c) a controller (20) in electrical communication with the thick-film printed and fired heater circuit assembly through removably attachable first and second electrical leads (158, 160) at first and second contact pads (62, 64), respectively, on the third electrically conductive bus strips, controlling a temperature of the first plate top food-cooking surface using temperature sensor (39) removably attached to first plate;
   the first plate, thick-film printed and fired heater circuit assembly and a second plate (30) combine to form cooking plate assembly (50) wherein:
      (i) the maximum temperature difference between an operator selected set point temperature and any temperature of the first plate top food-cooking surface in contact with food is less than about 10 C for set point temperatures up to about 230 C, and
      (ii) the rate of heat-up of the first plate from about 25 C to about 150 C is less than about 30 seconds using an applied voltage of 115 volts and maximum current of 20 amps for the single heating circuit assembly substantially covering the first plate back surface.

2. The isothermal cooking plate assembly of claim 1, wherein the first plate comprises Aluminum Type 1100 or Aluminum Type 6061.

3. The isothermal cooking plate assembly of claim 1, wherein a metal cladding layer is disposed on top food-cooking surface of high thermal conductivity first plate, the cladding layer thickness being in the range from 0.002 inch to 0.010 inches.

4. The isothermal cooking plate assembly of claim 3, wherein the cladding material comprises austenitic stainless steel.

5. The isothermal cooking plate assembly of claim 1, wherein the second plate (30) of low thermal conductivity material is mechanically attached to the back surface of the first plate and oppositely disposed to the top food-cooking surface.

6. The isothermal cooking plate assembly of claim 5, wherein an air gap (203) is present between the second plate and the surface of screen-printed and fired heater circuit assembly disposed on the first plate back surface.

7. The isothermal cooking plate assembly of claim 1, wherein a non-stick coating (54) is disposed on the top food-cooking surface of the first plate.

8. The isothermal cooking plate assembly of claim 1, wherein the controller includes the temperature sensor for temperature feedback control.

9. The isothermal cooking plate assembly of claim 1, wherein the electrically resistive heating element legs contains a metal alloy having a temperature coefficient electrical resistance of less than 700 parts per million per degree C.

10. The isothermal cooking plate assembly of claim 1, wherein the isothermal cooking plate assembly is mechanically attached to the griddle system and replaceable in the field by mechanically disconnecting the first and second electrical leads from first and second contact pads, respectively, and by mechanically disconnecting temperature sensor from the first plate and mechanically disconnecting cooking plate assembly from the griddle system.

11. An array of two or more of the isothermal laminate cooking plate assemblies of claim 1, wherein each isothermal cooking plate assembly being independently controllable.

12. The isothermal cooking plate assembly of claim 1, wherein the maximum allowable difference $\{T_1'-T_2'\}_{max}$ between the temperature of the first surface (155) of the first electrically insulative layer, $T_1'$ and the temperature of the second surface (157) of the first electrically insulative layer, $T_2'$ is calculated based on the breaking strength, $\sigma_{dielectric}$ of the glass first electrically insulative layer, as well as the modulus of elasticity, $E_{dielectric}$, coefficient of thermal expansion, $\alpha_{dielectric}$ and Poisson's ratio, $\mu$ for the glass first electrically insulative layer according to the equation:

$$(T'_1-T'_2)_{max}=\{\sigma_{dielectric}(1-\mu)\}/\{\alpha_{dielectric}*E_{dielectric}\}.$$

13. The isothermal cooking plate assembly of claim 12, wherein the wherein the calculated maximum allowable difference $\{T_1'-T_2'\}_{max}$ is 34.4 C for the first electrically insulative layer wherein the nominal breaking strength, $\sigma_{dielectric}$ of the glass first electrically insulative layer is 10,000 psi, the nominal modulus of elasticity, $E_{dielectric}$ is $9.7\times10^6$ psi, the coefficient of thermal expansion, $\alpha_{dielectric}$ is $21\times10^{-6}$ per degree C. and the nominal Poisson's ratio, $\mu$ is 0.3 for the glass first electrically insulative layer.

14. The method of manufacturing an isothermal cooking plate assembly comprising the steps of:
(a) providing a first plate comprising aluminum whose thickness is substantially uniform, having a thermal conductivity of at least 1.67 watts/cm-C, a surface area of not greater than 54 square inches, a length-to-width aspect ratio that does not exceed about 1.5, a thickness in the range of 0.187 to 0.250 inches, and having a back surface and an oppositely disposed top food-cooking surface;
(b) depositing a thick-film printed and fired heater circuit assembly on and substantially covering the first plate back surface comprising the steps of:
(i) thick film printing and firing a glass thick-film printed and fired electrically insulative layer on the first plate back surface, the glass thick-film printed and fired electrically insulative layer having a thickness that does not exceed a maximum allowed thickness, $t_{dielectric}$ of the glass thick-film printed and fired first electrically insulative layer which avoids fracture, cracking and/or breaking of the thick-film printed and fired first electrically insulative layer during rapid heat-up of the aluminum first plate, the maximum allowed thickness, $t_{dielectric}$ calculated using the equation the following equation (Equation 1H):

$$t_{dielectric}=[\{\sigma_{dielectric}*(1-\mu)\}/\{\alpha dielectric*E_{dielectric}\}]*[k_{dielectric}/\{Q_{heater}/A_{heater}\}],$$

wherein the calculated maximum allowed value for the thickness, $t_{dielectric}$ of the glass thick-film printed and fired first electrically insulative layer is based on maximum level of applied heat flux, $\{Q_{heater}/A_{heater}\}$ and known thermal conductivity, $k_{dielectric}$ of the glass thick-film printed and fired first electrically insulative layer as well as the known properties of glass including the breaking strength of glass, $\sigma_{dielectric}$; modulus of elasticity, $E_{dielectric}$ coefficient of thermal expansion, $\alpha_{dielectric}$ and Poisson's ratio, $\mu$;
(ii) thick film printing and firing an electrically conductive bus strip in electrical communication with the electrically resistive heating element legs and mechanically connectable to and in electrical communication with the first and second electrical leads;
(iii) thick film printing and firing second an electrically resistive heating element legs disposed on the electrically insulative layer;
(iv) thick film printing and firing an electrically insulative cover layer over the electrically conductive bus strips except at locations of contact pads as well as over the electrically resistive heating element legs; and
(c) mechanically attaching a second plate of low thermal conductivity material to the back surface of the first plate of high thermal conductivity material and oppositely disposed to the top food-cooking surface.

15. The method of claim 14, including the step of providing the first plate to be comprised of Aluminum Type 1100 or Aluminum Type 6061.

16. The method of claim 14, including the step of disposing a cladding layer on the top food-cooking surface of first plate, the cladding layer having a thickness in the range from 0.002 inch to 0.010 inch.

17. The method of claim 14, including the step of providing the cladding material of austenitic stainless steel.

18. The method of claim 14, including the step of interposing an air layer between the second plate and the screen-printed and fired heater circuit assembly on the first plate back surface.

19. The method of claim 14, including the step of disposing a layer of non-stick material on the top food-cooking surface of the first plate.

20. The method of claim 14, including the step of controlling a temperature of the first plate top food-cooking surface by providing a controller in electrical connection with the fired heater circuit assembly through the first and second electrical leads and in thermal communication with a temperature sensor for temperature feedback control of the first plate.

21. The method of claim 14, including the step of providing the electrically resistive heating element legs comprising a metal alloy having a temperature coefficient electrical resistance of less than 700 parts per million per degree C.

22. The method of claim 14, including the step of attaching the isothermal cooking plate assembly to the griddle system using only mechanical fasteners to enable field replaceable isothermal cooking plate assembly.

* * * * *